US009432867B2

(12) United States Patent
Javed

(10) Patent No.: US 9,432,867 B2
(45) Date of Patent: Aug. 30, 2016

(54) METHOD AND NETWORK MONITORING PROBE FOR TRACKING IDENTIFIERS CORRESPONDING TO A USER DEVICE IN WIRELESS COMMUNICATION NETWORK

(71) Applicant: CELLOS SOFTWARE LTD., Melbourne, Victoria (AU)

(72) Inventor: Adnan Javed, Fawkner (AU)

(73) Assignee: CELLOS SOFTWARE LTD., Melbourne, Victoria (AU)

( * ) Notice: Subject to any disclaimer, the term of this patent is extended or adjusted under 35 U.S.C. 154(b) by 129 days.

(21) Appl. No.: 14/462,447

(22) Filed: Aug. 18, 2014

(65) Prior Publication Data

US 2015/0078173 A1   Mar. 19, 2015

Related U.S. Application Data

(60) Provisional application No. 61/878,727, filed on Sep. 17, 2013.

(51) Int. Cl.
| | | |
|---|---|---|
| H04W 24/08 | (2009.01) | |
| H04W 36/00 | (2009.01) | |
| H04W 8/18 | (2009.01) | |
| H04W 36/12 | (2009.01) | |

(52) U.S. Cl.
CPC ............. *H04W 24/08* (2013.01); *H04W 36/00* (2013.01); *H04W 8/18* (2013.01); *H04W 36/12* (2013.01)

(58) Field of Classification Search
CPC ... H04W 24/08; H04W 36/00; H04W 36/12; H04W 8/18
See application file for complete search history.

(56) References Cited

U.S. PATENT DOCUMENTS

| 7,558,234 | B2 * | 7/2009 | Dommaraju | .......... H04L 43/028 370/328 |
|---|---|---|---|---|
| 8,811,289 | B2 * | 8/2014 | Ivershen | ............... H04W 24/08 370/328 |
| 2012/0155428 | A1 * | 6/2012 | Bovo | ...................... H04L 43/18 370/331 |
| 2014/0029501 | A1 * | 1/2014 | Maehara | ............... H04W 36/16 370/312 |

OTHER PUBLICATIONS

3GPP TS 36.413 V11.0.0 (Jun. 2012), S1 Application Protocol (S1AP) (Release 11).*
3GPP TS 23.401 V11.3.0 (Sep. 2012), General Packet Radio Service (GPRS) enhancements for Evolved Universal Terrestrial Radio Access Network (E-UTRAN) access (Release 11).*

(Continued)

*Primary Examiner* — Moo Ryong Jeong
(74) *Attorney, Agent, or Firm* — Blakely Sokoloff Taylor & Zafman LLP

(57) ABSTRACT

A method and network monitoring probe for tracking identifiers corresponding to a user device are provided. The probe monitors a source base station (BS) for receipt of at least a first control plane message comprising a first control plane identifier and a first user device identifier; the probe also monitors the source MME for receipt of a second control plane message comprising a second control plane identifier, a second and a third user device identifier; when the first and the second control plane identifiers are identical and the first and the second user device identifiers are identical, the first and third user device identifier are respectively stored or output as an identified first and second user device identifier of the user device, and it is determined that the user device commences a S1-based handover when the first control plane message is determined as a handover required message.

18 Claims, 14 Drawing Sheets

(56) References Cited

OTHER PUBLICATIONS

3GPP TS 36.331 V11.0.0 (Jun. 2012), Radio Resource Control (RRC); Protocol specification (Release 11).*

3GPP TS 29.274 V11.7.0 (Jun. 2013), Evolved General Packet Radio Service (GPRS) Tunnelling Protocol for Control plane (GTPv2-C); Stage 3 (Release 11).*

* cited by examiner

METHOD AND NETWORK MONITORING PROBE FOR TRACKING IDENTIFIERS CORRESPONDING TO A USER DEVICE IN WIRELESS COMMUNICATION NETWORK

FIELD OF INVENTION

The present invention relates to apparatus and method of tracking identifiers associated with user specific tunnels corresponding to a user device in a wireless communication network such as a long term evolution (LTE) network and a LTE-Advanced network.

BACKGROUND

Network monitoring devices, such as monitoring probes, have been proposed to measure performance of traffic flows in LTE networks. However, when a handover for specific user device/user equipment (UE) occurs from the coverage of a source evolved Node B (eNB) to that of a target eNB, although the network monitoring device is able to observe that a handover has occurred, it cannot determine which UE is involved. In other words, it is difficult for the network monitoring device to track user specific tunnels (that is, specific logical connections of users) after a handover. Therefore, when a handover occurs, the network monitoring device may be not able to continue the measurement of traffic flows for a specific UE, especially, when the handover occurs from the coverage of a source MME to that of a target MME.

In view of the foregoing and other problems, it is desirable to provide a network monitoring device which is able to track user specific tunnels by tracking/identifying identifiers corresponding to a user device in Evolved-Universal Mobile Telecommunications System Terrestrial Radio Access Network (E-UTRAN) of LTE networks when a handover occurs.

SUMMARY

According to one embodiment of the present invention, there is provided a method for tracking identifiers corresponding to a user device by a network monitoring probe connected with a source base station, a target base station, a source mobility management entity device (MME) and a target MME in a wireless communication network, this method comprising:

monitoring the source base station by the network monitoring probe, for receipt of a first control plane packet data unit (PDU) comprising at least a first control plane message transmitted from the source base station to the source MME, the first control plane message including at least a first control plane identifier of the source base station, and a first user device identifier of the user device;

monitoring the source MME by the network monitoring probe, for receipt of a second control plane message transmitted from the source MME to the target MME, which comprises at least a second control plane identifier of the source base station, a second user device identifier and a third user device identifier wherein the second and the third user device identifiers uniquely identify the user device in the wireless communication network;

in response to receipt of the second control plane message, comparing the first control plane identifier of the source base station to the second control plane identifier of the source base station, comparing the first user device identifier to the second user device identifier, and determining whether the first control plane message is a handover required message; and in response to a determination that the first control plane identifier is identical to the second control plane identifier, the first user device identifier is identical to the second user device identifier and the first control plane message is a handover required message, storing in the network monitoring probe or an external management device the first user device identifier and the third user device identifier respectively as an identified first user device identifier and an identified second user device identifier of the user device, and also determining that the user device commences a S1-based handover.

In one embodiment of the invention, the first control plane identifier is a cell global identifier (CGI) of the source base station; the second control plane identifier is a CGI of the source base station; the first user device identifier is a radio network temporary identifier (RNTI) of the user device; the second user device identifier is a RNTI of a user device; and the third user device identifier is an International Mobile Subscriber Identity (IMSI) of a user device; the first control plane PDU is a S1 Application Protocol PDU; the first control plane message is a handover required message transmitted from the source base station to the source MME; and the second control plane message is a forward relocation request message transmitted from the source MME to the target MME. The first control plane message may further comprise a third control plane identifier of the target base station, the method may further comprising: in response to a determination that the first control plane identifier is identical to the third control plane identifier, the first user device identifier is identical to the second user device identifier and the first control plane message is a handover required message, storing in the network monitoring probe or an external management device the third control plane identifier of the target base station which the user device is to be handed over. Thus the identifier of the target base station corresponding to the user device during a S1-based handover can be tracked.

In order to further track control plane identifiers corresponding to the specific user device during a S1-based handover, e.g. control plane evolved NodeB UE S1 Application Protocol Identifier (eNB-UE-S1AP-ID) assigned by the target base station to the user device; and the control plane MME UE S1 Application Protocol Identifier (MME-UE-S1AP-ID) assigned by the target MME to the user device, according to one embodiment of the invention, the method further comprising:

monitoring the target MME connected with the source MME, by the network monitoring probe, for receipt of a second control plane PDU comprising at least a fourth control plane identifier, a fifth control plane identifier, and at least a third control plane message transmitted from the target MME to the target base station, which comprises at least a sixth control plane identifier and a fourth user device identifier;

in response to receipt of the third control plane message in the second control plane PDU, comparing the sixth control plane identifier to the first control plane identifier of the first control plane message and comparing the fourth user device identifier to the first user device identifier of the first control plane message; and in response to a determination that the sixth control plane identifier is identical to the second control plane identifier of the first control plane message and the fourth user device identifier is identical to the first user device identifier of the first control plane message, storing in the network monitoring probe or an external management device the fourth control plane identifier to be a control plane identifier assigned by the target base station to the user device, the fifth control plane identifier to be a control plane identifier assigned by the target MME to the user device.

In one embodiment of the invention, the third control plane message is a handover request message transmitted from the target MME to the target base station; the sixth control plane identifier of the third control plane message is a last visited CGI of a base station corresponding to the user device; the fourth user device identifier of the third control plane message is the RNTI assigned to the user device by the source base station; the second control plane PDU is S1AP PDU; the fourth control plane identifier is a control plane evolved NodeB UE S1 Application Protocol Identifier (eNB-UE-S1AP-ID) assigned by the target base station to the user device; and the fifth control plane identifier is a control plane MME UE S1 Application Protocol Identifier (MME-UE-S1AP-ID) assigned by the target MME to the user device.

According to one embodiment of the invention, a networking monitoring probe is also provided to track identifiers corresponding to a specific user device, wherein the network monitoring probe connected with a source base station, a target base station, a source mobility management entity device (MME) and a target MME in wireless communication network, the network monitoring probe comprising:

a control plane message monitor, configured to monitor the source base station for receipt of a first control plane packet data unit (PDU) comprising at least a first control plane message transmitted from the source base station to the source MME, the first control plane message including at least a first control plane identifier of the source base station, and a first user device identifier of the user device;

the control plane message monitor, further configured to monitor the source MME for receipt of a second control plane message transmitted from the source MME to the target MME, the second control plane message including at least a second control plane identifier of the source base station, a second user device identifier and a third user device identifier wherein the second and the third user device identifiers are used to uniquely identify the user device in the wireless communication network;

the control plane message monitor, further configured to determine whether the first control plane message is a handover required message;

an identifier comparator, configured to compare the first control plane identifier of the source base station to the second control plane identifier of the source base station and compare the first user device identifier to the second user device identifier;

an identifier output, configured to output to a storage unit within the network monitoring probe or a management device external to the network monitoring probe, the first user device identifier of the first control plane message and the third user device identifier of the second control plane message as identified first user device identifier and identified second user device identifier of the user device, in response to a determination that the first control plane identifier is identical to the second control plane identifier and also the first user device identifier is identical to the second user device identifier; and the identifier comparator, further configured to determine that the user device with the identified first and the second user device identifiers commences a S1-based handover, in response to the determination that first control plane identifier is identical to the third control plane identifier, the first user device identifier is identical to the second user device identifier, and the first control plane message is the handover required message.

In one embodiment of the invention, the first control plane identifier is a cell global identifier (CGI) of the source base station; the second control plane identifier is a CGI of a base station; the first control plane PDU is a S1 Application Protocol PDU; the first control plane message is a handover request message transmitted from the source base station to the source MME; the second control plane message is a forward relocation request message transmitted from the source the source MME to the target MME; and the third user device identifier is an International Mobile Subscriber Identity (IMSI) of a user device. The first control plane message may further comprise a third control plane identifier which is a CGI of the target base station to which the user device is to be handed over; the first user device identifier is a radio network temporary identifier (RNTI) of the user device; and the second user device identifier is a RNTI of a user device.

Using the method and networking monitoring probe in the invention, the user device identifiers e.g. the RNTI and IMSI of the user device will be identified and stored in the networking monitoring probe or a management device external to the networking monitoring probe. The identified user device may be used to identify updated control plane identifiers or updated user device identifiers corresponding to a specific user device during a S1-based handover. Furthermore, according to one embodiment of the invention, the networking monitoring probe in this invention may also track and identify control plane identifiers corresponding to a specific user device during a S1-based handover, e.g. control plane identifier of the target base station, eNB-UE-S1AP-ID assigned by the source/target base station to the user device; and MME-UE-S1AP-ID assigned by the source/target MME. Therefore, the network monitoring probe is able to track user specific tunnels by tracking/identifying identifiers corresponding to a specific user device even when a handover occurs.

BRIEF DESCRIPTION OF DRAWINGS

Embodiments of the invention will now be described by way of example only with reference to the accompanying drawings, in which.

DETAILED DESCRIPTION

Figure 1:
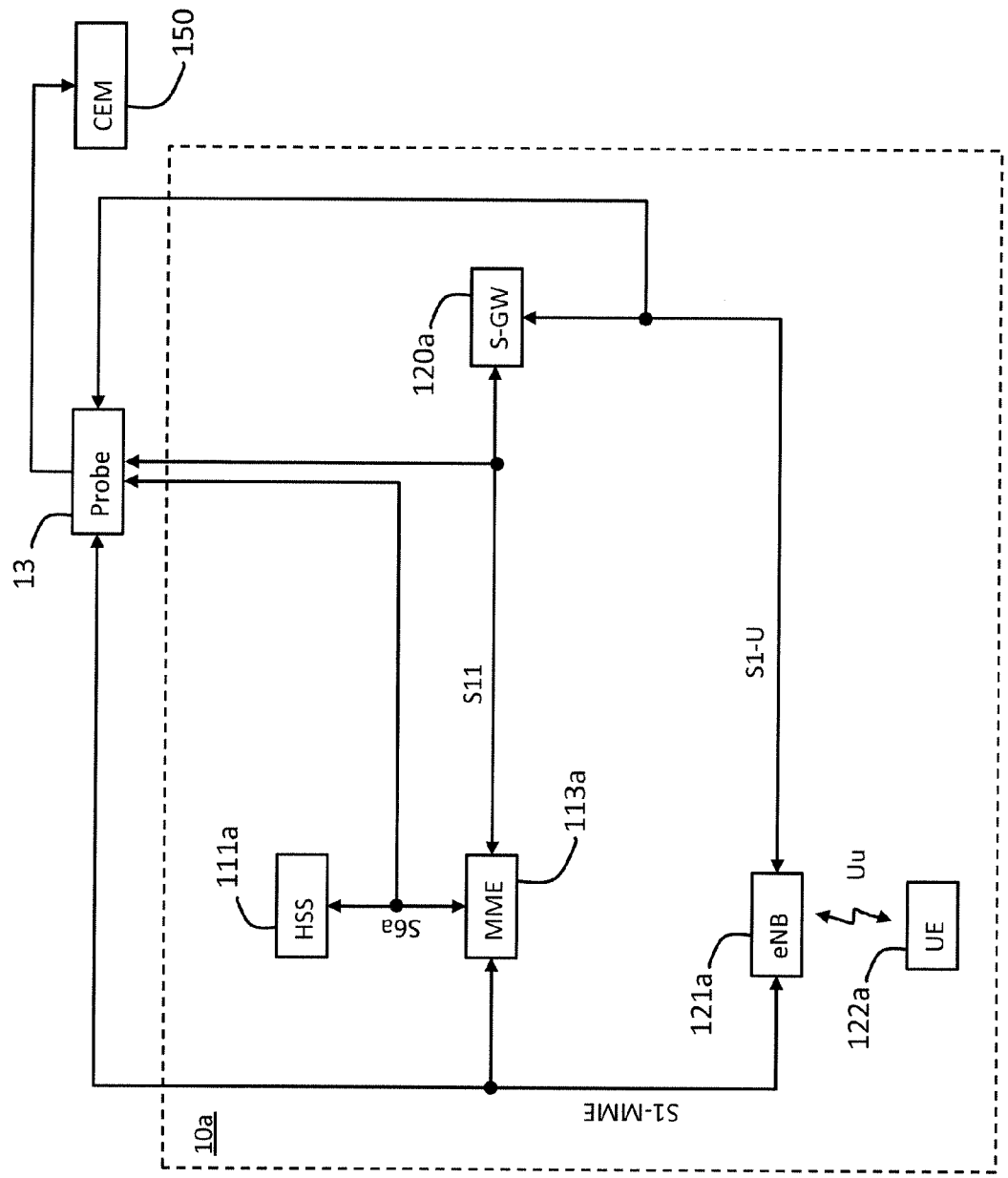
FIG. 1 is a schematic diagram illustrating a network in connection with a network monitoring probe according to an embodiment of the invention.
Figure 2:
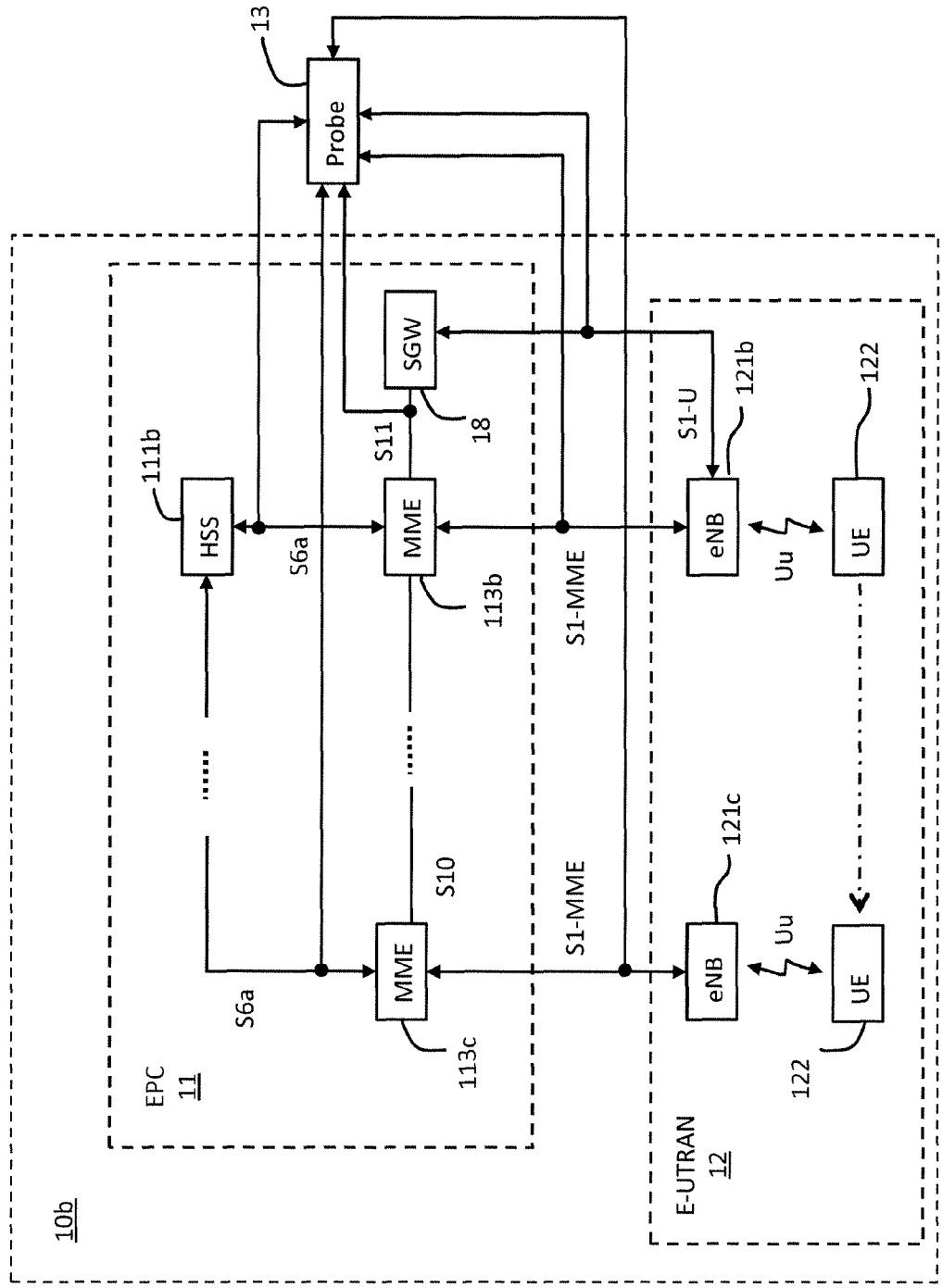
FIG. 2 is a schematic diagram illustrating the network monitoring probe of FIG. 1 in connection with another network.

Referring to the accompanying drawings, in one example of the invention, there is illustrated a monitoring probe for identifying a user plane identifier (for example, a user plane Serving-Gateway Internet Protocol address (S-GW IP address), a user plane S-GW Tunnelling End Identity (S-GW TEID), an Evolved Node B IP address (eNB IP address), or a eNB TEID) of a user device (that is, a User Equipment (UE)) of a network, e.g. the UE 122 of the network 10a in FIG. 1 and the UE 122 of the network 10b in FIG. 2. When in use, the network monitoring probe monitors one or more network devices of the network for receipt of control plane messages. Each of the control plane messages comprises at least a control plane identifier. Also, one of the control plane messages comprises a user device identifier, and the other one of the control messages comprises a user plane identifier. The network monitoring probe is configured to compare the control plane identifiers of the respective control plane messages to determine whether or not the control plane identifiers correspond to each other. If so, the network monitoring probe stores or outputs to a management device external to the network monitoring probe, e.g. a Customer Experience Management (CEM) connected to the network monitoring probe, the user plane identifier such that the user plane identifier is identified as the user plane identifier of the user device.

In another example, when in use, the network monitoring probe monitors one or more network devices of the network for receipt of control plane messages, in order to identify a control plane identifier when a UE of the network performs handover, such as a S1-based handover or X2-based handover defined in 3GPP LTE standard. When in use, the network monitoring probe monitors one or more network devices of the network for receipt of control plane messages. Each of the control plane messages comprises at least a control plane identifier. Also, one of the control plane messages comprises an updated control plane identifier, and the other one of the control messages comprises another updated control plane identifier. The network monitoring probe 13 is configured to compare the control plane identifiers of the respective control plane messages to determine whether or not the control plane identifiers correspond to each other. If so, the network monitoring probe outputs the updated control plane identifiers such that the updated control plane identifier is identified as the latest control plane identifiers of the user device along with the previously identified user plane identifier of the user device.

The network monitoring probe is adapted to identify a user plane identifier or a control plane identifier of a user device of a network that conforms to the 3GPP LTE standard. Thus, many of the terms mentioned in this specification are technical terms defined by the Third Generation Partnership Project (3GPP). For example, the terms "user plane" and "control plane" refer respectively to the user plane architecture and the control plane architecture of the radio protocol architecture of the 3GPP LTE standard. Persons skilled in the art will appreciate that user data is carried on the user plane and control/signalling information is carried on the control plane.

Persons skilled in the art will appreciate that the network monitoring probe is typically a passive monitoring probe that does not directly transmit to any of the network device or devices monitored by the network monitoring probe, but could alternatively be an active monitoring probe that interacts directly with one or more of the network devices. Also, it should be envisaged that the network monitoring probe can output report, for example, traffic flows statistic report calculated based on monitored user plane data transfer in the network, to another network device such as a CEM system.

FIG. 1 is a schematic diagram illustrating the network monitoring probe 13 for identifying a user plane identifier or a control plane identifier of a UE 122 of the network 10a. The UE 122 is connected to an eNB 121a of the network 10a, and data may be communicated between the user device 122 and the eNB 121a. Persons skilled in the art will appreciate that data between the user device 122 and the eNB 121a is typically communicated over a radio channel on an air interface, for example, in the form of a Uu interface when the network 10a is a UMTS network or a LTE network.

The eNB 121a is connected to an MME 113a of the network 10a which in turn is connected to a Home Subscriber Service (HSS) server 111a of the network 10a and an S-GW 120a (or Serving General Packet Radio Service (GPRS) Support Node (SGSN)) of the network 10a. Control plane messages are communicated between the eNB 121a and the MME 113a on a control plane interface in the form of a S1-MME interface. Control plane messages are communicated between the MME 113a and the HSS 111a on another control plane interface in the form of an S6a interface. Control plane messages are communicated between the MME 113a and the S-GW 120a on another control plane interface in the form of a S11 interface. The S-GW 120a is also connected to the eNB 121a. User plane messages are communicated between the S-GW 120a and the eNB 121a on a user plane interface in the form of a S1-U interface. Persons skilled in the art will appreciate that data may be bi-directionally communicated between any of these two devices. For example, the data communicated between the UE 122 and the eNB 121a may be in either an uplink direction from the UE 122 to the eNB 121a or in a downlink direction from the eNB 121a to the UE 122.

The network monitoring probe 13 is connected to the S1-MME interface between the eNB 121a of the network and the MME 113a of the network, and is adapted to monitor (that is, "sniff") the S1-MME interface between the eNB 121a and the MME 113a for control plane messages or packets communicated between the eNB 121a and the MME 113a on the S1-MME interface. The network monitoring probe 13 is also connected to the S6a interface between the MME 113a and the HSS 111a, and is adapted to monitor the S6a interface between the MME 113a and the HSS 111a for control plane messages or packets communicated between the MME 113a and the HSS 111a on the S6a interface. The network monitoring probe 13 is also connected to the S11 interface between the MME 113a and the S-GW 120a, and is adapted to monitor the S11 interface between the MME 113a and the S-GW 120a for control plane messages or packets communicated between the MME 113a and the S-GW 120a on the S11 interface. The network monitoring probe 13 is also connected to the S1-U interface between the eNB 121a and the S-GW 120a, and is adapted to monitor the S1-U interface between the eNB 121a and the S-GW 120a for user plane messages or packets communicated between the eNB 121a and the S-GW 120a on the S1-U interface.

The network monitoring probe 13 is also connected to a CEM system 150, and is configured to output a user plane identifier to the CEM system 150 such that the user plane identifier can be identified by the CEM system 150 as the user plane identifier of the UE 122. It is envisaged that the network monitoring probe 13 may also be additionally configured to transmit or report information (such as traffic flow statistics derived from the user plane messages or packets communicated on the S1-U interface, and/or the control plane messages on the S1-MME interface and/or on the S11 interface) to the CEM system 150. For example, the network monitoring probe 13 may report one or more of the following, in respect of each UE (or mobile subscriber):
  (i) Amount of downloaded data, and/or amount of uploaded data;
  (ii) Average download speed, and/or average upload speed;
  (iii) Average number of download successes, average number of download failures, and/or download success rate;
  (iv) Number of retransmissions;
  (v) Number of signalling messages, number of successful signalling messages, and/or number of failure signalling messages
  (vi) Session Duration (where a session is an application connected to an application server over the Internet), and/or average number of sessions within specified duration;
  (vii) Amount of User Data/network signalling (which may be represented as a ratio); and
  (viii) Average application layer service connect latency, and/or peak application connect latency.

It is envisaged that an alternative embodiment of the network monitoring probe 13 may not be connected to all of the interfaces mentioned above. For example, in an alternative embodiment, the network monitoring probe 13 may be connected only to the eNB 121a on the S1-MME interface, and is adapted to only monitor the eNB 121a for control plane messages transmitted from the eNB 121a to the MME 113a on the S1-MME interface.

As indicated above, user data (or user plane messages) communicated on the user plane between the UE 122 and the eNB 121a may be in either an uplink direction from the UE 122 to the eNB 121a or in a downlink direction from the eNB 121a to the UE 122. This user data is communicated between the eNB 121a and the S-GW 120a on the S1-U interface between the eNB 121a and the S-GW 120a.

A UE 122 may move from a radio coverage area of the eNB 121a and a mobility management service area of the MME 113a to a radio coverage area of neighbouring eNB (not shown in FIG. 1) and a mobility management service area of another MME (not shown in FIG. 1).

FIG. 2 is a schematic diagram illustrating the network monitoring probe 13 in connection with an alternative network 10b. As illustrated, the network 10b includes two eNBs 121b, 121c in connection with (i) two MMEs 113b, 113c respectively and (ii) UE 122 respectively. The eNBs 121b, 121c and the UE 122 are part of the Evolved Universal Terrestrial Radio Access Network (E-UTRAN) portion 12 of the network 10b. The MMEs 113b, 113c, HSS 111b and S-GW 120b (not shown) are part of the Evolved Packet Core (EPC) portion 11 of the network 10b. When within the radio coverage area of the eNB 121b, the UE 122 communicates with the eNB 121b via air interface Uu. When within the radio coverage area of the eNB 121c, the UE 122 also communicates with the eNB 121c via air interface Uu. The UE 122 and eNBs 121b, 121c all have transceiver components, antenna and wireless communication protocol stack software operating with, for example, physical layer (PHY), Medium Access Control (MAC) layer, Radio Link Control (RLC) layer, and Packet Data Convergence Protocol (PDCP) layer. In this example, the eNBs 121b, 121c also operate with Radio Resource Control (RRC) layer to provide radio resource management on a control plane. Furthermore, eNBs 121b, 121c perform ciphering/deciphering of user plane data packets and control plane signalling/messages on their respective Uu interfaces.

Figure 3:
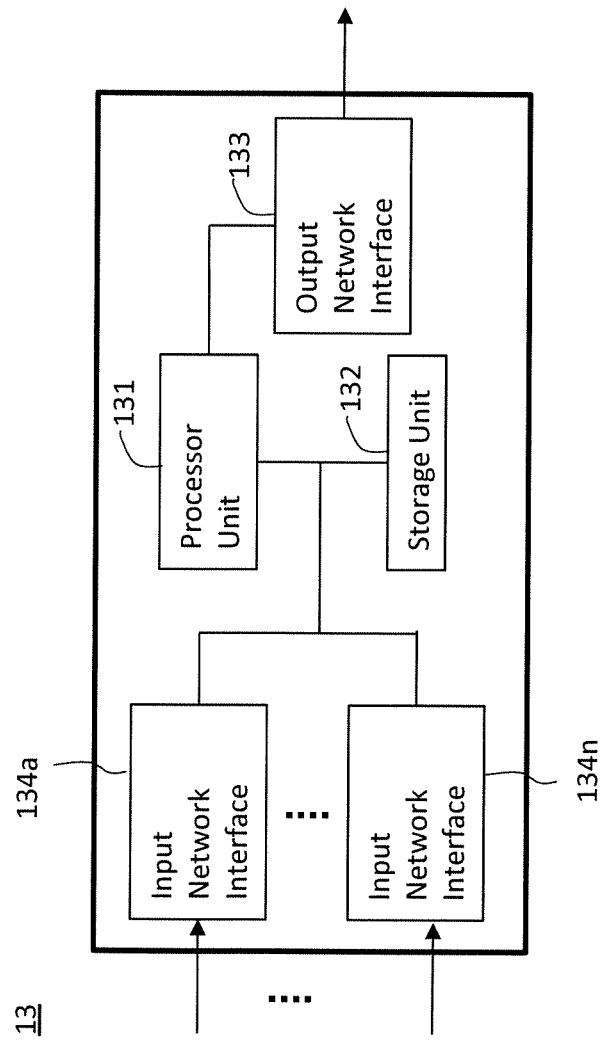
FIG. 3 is a block diagram showing physical components of the network monitoring probe according to an embodiment of the invention.

FIG. 3 is a schematic diagram of physical components of the network monitoring probe 13. The network monitoring probe 13 includes a processor unit 131, a storage unit 132, an output network interface 133, and one or more input network interfaces 134, e.g. input network interface 134a . . . 134n as shown in FIG. 3. It is envisaged that the network monitoring probe 13 will typically include more than one input network interface 134. However, a person skilled in the art will appreciate that an embodiment of the network monitoring probe 13 may include only one input network interface 134. For example, in an embodiment of the network monitoring probe 13 where the network monitoring probe 13 is configured to only monitor for the control plane messages transmitted from the eNB 121 to the MME 113 on the S1-MME interface, the network monitoring probe 13 may have only one input network interface 134.

Each of the input network interfaces 134a . . . 134n is connected to a respective one of the eNB 121, MME 113, HSS 111 and S-GW 120 on a high-speed link. The processor unit 131 is configured to implement (or execute) a number of software modules based on program code and/or data stored in the storage unit 132. In particular, the memory unit 32 stores program code for implementing software modules for identifying a user plane identifier of the UE 122.

Figure 4:
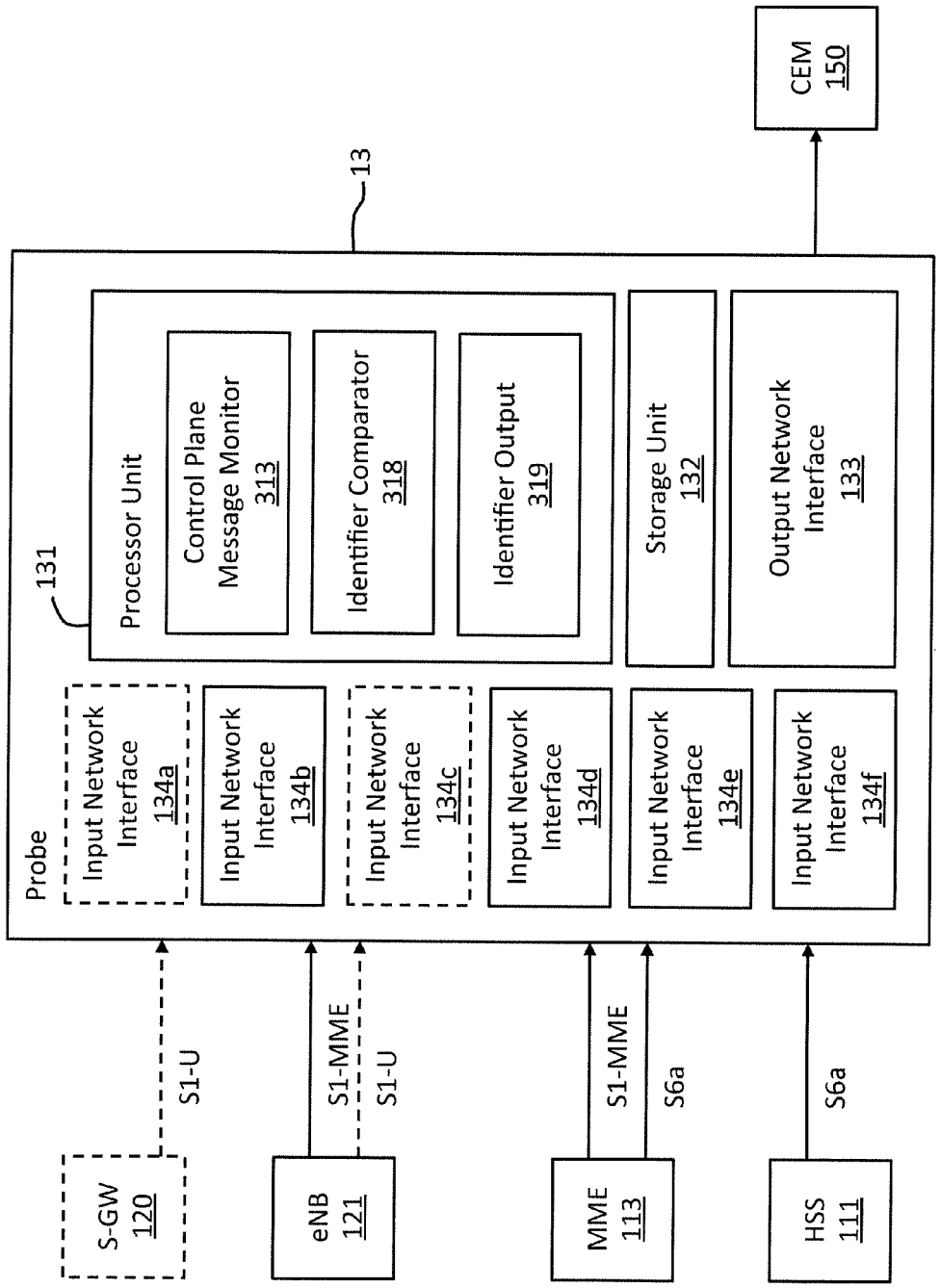
FIG. 4 is a schematic diagram of the functional components of the network monitoring probe of FIG. 1.

FIG. 4 is a schematic diagram of the functional components of the network monitoring probe 13 for identifying the user plane identifier of a UE 122 of a network 10 e.g. a network 10a or network 10b. In this embodiment, the functional components are software modules implemented by the processor unit 131 of the network monitoring probe 13. However, persons skilled in the art will appreciate that one or more of the functional components could alternatively be implemented in some other way, for example, by one or more dedicated electronic circuits.

One of the software modules implemented by the processor unit 131 is a control plane message monitor 313. The control plane message monitor 313 is adapted to monitor one or more of the network devices of the network 10 for receipt of at least two control plane messages. Each of the control plane messages comprises at least one control plane identifier. Also, at least one of the control plane messages comprises at least one user device identifier, and at least another one of the control plane messages comprises at least one user plane identifier.

In one embodiment of the network monitoring probe 13, the control plane message monitor 313 first monitors the one or more network devices for a first control plane message comprising a first control plane identifier and a user device identifier. The one or more network devices monitored by the control plane message monitor 313 for receipt of the first control plane message is an eNB 121 of the network 10. The first control plane message may be an Attach Request message transmitted over a S1-MME interface between the eNB 121 and a corresponding MME 113 (that is, a MME 113 in communication with the eNB 121 over the S1-MME interface). When the network monitoring probe 13 is in use, the control plane message monitor 313 monitors the eNB 121 via one input network interface 134, e.g. one of the input network interfaces 134 a-f as shown in FIG. 4, in communication with the eNB 121 for receipt of an Attach Request message. If the first control plane message is an Attach Request message, the first control plane identifier is a control plane evolved NodeB S1 Application Protocol Identifier (eNB-UE-S1AP-ID) in the Attach Request message, and the user device identifier is either an International Mobile Subscriber Identity (IMSI) or a Globally Unique Temporary Identity (GUTI).

In response to receipt of the first control plane message, the control plane message monitor 313 then monitors the MME 113 over the S6a interface between the the MME 113 and a HSS 111 for receipt of a second control plane message comprising a second control plane identifier and a user plane identifier. For example, the second control plane message is an Authentication Information Request Message comprising (i) the user plane identifier in the form of IMSI; and (ii) the second control plane identifier in the form of a sequence number.

In an alternative embodiment of the network monitoring probe 13, in response to receipt of a first control plane message in the form of an Attach Request message from the eNB 121, the control plane message monitor 313 monitors the MME 113 for receipt of a second control plane message in the form of an Authentication Request message which may comprise a second control plane identifier in the form of a control plane MME-UE-S1AP-ID or eNB-UE-S1AP-ID, and also monitors the eNB 121 for receipt of a third control plane message in the form of an Authentication Response message comprising a third control plane identifier in the form of a control plane authentication result RES.

In the alternative embodiment where the one or more network devices monitored by the control plane message monitor 313 for receipt of the second control plane message is an MME 113 of the network 10, the control plane message monitor 313 monitors the MME 113 via one of the input network interfaces 134a-f in communication with the MME 113 for receipt of the Authentication Request message, upon receipt of the first control plane message (that is, the Attach Request message). In yet another embodiment where the one or more network devices monitored by the control plane message monitor 313 for receipt of the second control plane message is the eNB 121, the control plane message monitor 313 monitors the eNB 121 via the input network interface 134 in communication with the eNB 121 for receipt of the Authentication Response message, upon receipt of the first control plane message (that is, the Attach Request message).

Another one of the software modules implemented by the processor unit 131 is an identifier comparator 318. The identifier comparator 318 may be adapted to compare the first control plane identifier received by the control plane message monitor 313 with the second control plane identifier subsequently received by the control plane message monitor 313, in order to determine whether or not the first control plane identifier received by the control plane message monitor 313 corresponds to the second control plane identifier subsequently received by the control plane message monitor 313. For example, when the first control plane identifier is a control plane eNB-UE-S1AP-ID, and the second control plane identifier is also a control plane eNB-UE-S1AP-ID, the identifier comparator 318 compares the first control plane identifier and the second control plane identifier to determine whether they correspond to each other. The identifier comparator 318 makes this comparison in response to the control plane message monitor 313 receiving the second control plane identifier.

Thus, when the network monitoring probe 13 is in use, the identifier comparator 318 compares (i) the user device identifier IMSI of the Attach Request message received by the control plane message monitor 313 from the eNB 121 to (ii) the user device IMSI of the Authentication Information Request Message received by the control plane message monitor 313 from the MME 113, and determines whether or not (i) corresponds to (ii) based on the comparison.

As indicated above, user device identifier IMSI of the first control plane message and the second control plane message are used to determine whether or not the first control plane message and the second control plane message are inter-related. It is envisaged that a control plane identifier other than the user device identifier IMSI may be used to determine whether or not the first control plane message and the second control plane message are inter-related. For example, in an alternative embodiment, control plane MME-UE-S1AP-IDs of the first control plane message and the second control plane message may alternatively be used to determine whether or not the first control plane message and the second control plane message are inter-related.

The processor unit 131 also implements an identifier output 319 adapted to, in response to a determination by the identifier comparator 318 that the first control plane identifier received by the control plane message monitor 313 corresponds to the second control plane identifier received by the control plane message monitor 313, and/or the user device identifier of the first control plane message corresponds to the user device identifier of the second control plane message, output the user plane identifier received by the control plane message monitor 313 such that the user plane identifier is identified as the user plane identifier of the user device 122. The identifier output 319 is also adapted to output the identified user device identifier (i.e, IMSI) of the user device 122 in association with the control plane identifiers such as eNB-UE-S1AP-ID, MME-UE-S1AP-ID received from the Attach Request message received by the control plane message monitor 313 from the eNB 121.

Thus, upon a determination by the identifier comparator 318 that (i) the user device identifier IMSI of the Attach Request message received by the control plane message monitor 313 from the eNB 121 corresponds to (ii) the user device identifier IMSI of the Authentication Information Request Message received by the control plane message monitor 313 from the MME 133, the identifier output 319 outputs (a) either the user plane eNB IP address or the user plane eNB TEID received by the control plane message monitor 313 from the eNB 121 or (b) either the user plane S-GW IP address or the user plane S-GW TEID received by the control plane message monitor 313 from the MME 113, such that the user plane eNB IP address, the user plane eNB TEID, the user plane S-GW IP address or the user plane S-GW TEID is identified with the user device identifier (that is, either the IMSI or GUTI) of the user device 122 received by the control plane message monitor 313 from the eNB 121.

The user plane identifier output by the identifier output 319 is communicated via an output network interface 133 of the network monitoring probe 13 to the CEM system 150. The CEM system 150 is adapted to receive the user plane identifier of the user device 122 output by the output network interface 133, to identify the data packets of the user device 122 communicated between the S-GW 120 and the eNB 121 in the user plane (that is, on the S1-U interface between the S-GW 120 and the eNB 121) based on the user plane identifier (that is, the user plane eNB IP address, the user plane eNB TEID, the user plane S-GW IP address or the user plane S-GW TEID) received by the CEM system 150, and to perform an analysis of the data packets of the user device 122 identified by the CEM system 150. Persons skilled in the art will appreciate that the data packets communicated between the S-GW 120 and the eNB 121 on the S1-U interface may be encapsulated in a GTPv1 tunnel or an IP packet, and may be identified by a user plane TEID in a GTPv1 header or a user plane IP address in an IP header (such as a user plane S-GW TEID in a GTPv1 header or a user plane S-GW IP address in an IP header for data packets transmitted from the eNB 121 to S-GW 120 in the uplink case, or by a user plane eNB TEID in a GTPv1 header or a user plane eNB IP address in an IP header for data packets transmitted from the S-GW 120 to eNB 121 in the downlink). In another embodiment, the network monitoring probe 13 can be configured to have a correlation processor (not shown) to identify the data packets of the user device 122 communicated between the S-GW 120 and the eNB 121 in the user plane (that is, on the S1-U interface between the S-GW 120 and the eNB 121) based on the user plane identifier (that is, the user plane eNB IP address, the user plane eNB TEID, the user plane S-GW IP address or the user plane S-GW TEID) output previously by the identifier output 319 to the correlation processor.

In addition to implementing the above mentioned software modules, the processor unit 131 is also configured to store in the storage unit 132 data and/or information extracted or derived from the data packets (such as the user plane identifier) received by the network monitoring probe 13. For example, the processor unit 131 may store in the storage unit 132 the identifiers received by the network monitoring probe 13, for building a mapping table for enabling subscribers (such as the CEM system 150) of the network monitoring probe 13 to identify user specific tunnels (that is, specific logical connections of users) traversed on the user plane.

It is envisaged that an embodiment of the network monitoring probe 13 may include either one of the input network interfaces 134 in communication with an eNB 121 of the network 10, or two of the input network interfaces 134 in communication with respectively an eNB 121 and a corresponding MME 113 of the network 10. That is, an embodiment may not include input network interfaces in communication with respectively a S-GW 120, a HSS 111 or both a S-GW 120 and a HSS 111 (that is, the network devices indicated by dotted lines in FIG. 4) of the network 10.

Also, it is envisaged that messages other than the first control plane message and the second control plane message may be received by the control plane message monitor 313 of the network monitoring probe 13 while the control plane message monitor 313 is monitoring the eNB 121, the MME 113 or both the eNB 121 and the MME 112 or all of the eNB 121, the MME 113 and the HSS 111. For example, the control plane message monitor 313 may receive an Authentication Response message from the eNB 121 after receiving a first control plane message in the form of an Attach Request message from the eNB 121, while the control plane message monitor 313 is monitoring for a second control plane message in the form of an Initial Context Setup Response Message from the eNB 121.

It is also envisaged that the network monitoring probe 13 may associate identifiers from different messages. For example, the network monitoring probe 13 may associate the MME-UE-S1AP-ID received from the Authentication Response message with the IMSI received from the Attach Request message. It is envisaged that the network monitoring probe 13 may associate identifiers with one another in different ways. For example, a MME-UE-S1AP-ID received from an Authentication Response message may be associated with an IMSI received from an Attach Request message, by storing the MME-UE-S1AP-ID in association with the IMSI in the storage unit 132. In another example, the MME-UE-S1AP-ID and the IMSI may be associated with each other, by outputting the MME-UE-S1AP-ID together with the IMSI or by outputting the MME-UE-S1AP-ID and the IMSI one after another.

It is envisaged that the control plane message monitor 313 may, in an alternative embodiment of the network monitoring probe 13, monitor (i) more than two control plane messages (that is, in addition to a first control plane message and a second control plane message), and (ii) another network device or devices (that is, other than just the eNB 121 or the eNB 121 and the MME 113).

For example, in another alternative embodiment of the network monitoring probe 13, the control plane message monitor 313 may monitor:

(i) first the eNB 121 for receipt of a first control plane message in the form of an Attach Request message comprising a control plane eNB-UE-S1AP-ID and a user device identifier in the form of either an IMSI or a GUTI;

(ii) an MME 113 for receipt of a second control plane message in the form of an Authentication Information Request message comprising a user device identifier in the form of an IMSI and a control plane identifier in the form of a sequence number;

(iii) then a corresponding HSS 111 (that is, a HSS 111 in communication with the MME 113 on a S6a interface between the HSS 111 and the MME 113) for receipt of a third control plane message in the form of an Authentication Information Answer message comprising a control plane identifier in the form of a sequence number and a control plane parameter in the form of an expected authentication result (XRES);

(iv) followed by a corresponding eNB 121 (that is, an eNB 121 in communication with the MME 113 on a S1-MME interface between the eNB 121 and the MME 113) for receipt of a fourth control plane message in the form of an Authentication Response message comprising a control plane parameter in the form of an authentication result (RES) and a control plane identifier in the form of a control plane eNB-UE-S1AP-ID;

(v) followed by a MME 113 (that is, a MME 113 in communication with the HSS 111 on a S6a interface between the HSS 111 and the MME 113) for receipt of a fifth control plane message in the form of an Update Location Request message comprising a user device identifier IMSI; and (vi) finally followed by then a corresponding HSS 111 (that is, a HSS 111 in communication with the MME 113 on a S6a interface between the HSS 111 and the MME 113) for receipt of a corresponding control plane message in the form of an Update Location Answer comprising another user device identifier Mobile Station International Subscriber Directory Number (MSISDN).

In one embodiment of the network monitoring probe 13, the identifier comparator 318 compares (1) the sequence number in the Authentication Information Request message received from the MME 113 to the sequence number in the Authentication Information Answer message received from the HSS 111, and determines whether or not the two sequence numbers correspond to each other. Upon a determination that the two sequence numbers correspond to each other, the identifier comparator 318 compares (2) the XRES in the Authentication Information Answer message received from the HSS 111 to the RES in the Authentication Response message received from the eNB 121, and determines whether or not the XRES corresponds to the RES. Upon a determination that the XRES corresponds to the RES, the identifier comparator 318 compares (3) the control plane eNB-UE-S1AP-ID in the Authentication Response message received from the eNB 121 to the eNB-UE-S1AP-ID in the Authentication Request message received from the MME 113, and determines whether or not the two eNB-UE-S1AP-IDs correspond to each other.

Also, in this embodiment of the network monitoring probe 13, upon a determination that the control plane eNB-UE-S1AP-ID in the Authentication Response message received from the eNB 121 corresponds to either the eNB-UE-S1AP-ID in the Authentication Request message received from the MME 113 or the eNB-UE-S1AP-ID in the Initial Context Setup Response message received from the eNB 121 (that is, comparison (3)), the identifier output 319 outputs (a) the user plane eNB IP address or the user plane eNB TEID received by the control plane message monitor 313 from the eNB 121 or (b) the user plane S-GW IP address or the user plane S-GW TEID received by the control plane message monitor 313 from the MME 113, such that the user plane eNB IP address, the user plane eNB TEID, the user plane S-GW IP address or the user plane S-GW TEID is identified with the user device identifier (that is, the IMSI or GUTI or MSISDN) of the user device 122 received by the control plane message monitor 313 from the eNB 121 or the HSS 111.

It is envisaged that the comparisons (1), (2) and (3) in this embodiment of the network monitoring probe 13 may not be in sequence. For example, the identifier comparator 318 may compare the sequence number in the Authentication Information Request message received from the MME 113 to the sequence number in the Authentication Information Answer message received from the HSS 111 and determine whether or not the two sequence numbers correspond to each other (that is, comparison (1)), in response to a determination that the XRES corresponds to the RES. That is, the identifier comparator 318 may compare the XRES in the Authentication Information Answer message received from the HSS 111 to the RES in the Authentication Response message received from the eNB 121 and determines whether or not the XRES corresponds to the RES (that is, comparison (2)), before comparing the sequence number in the Authentication Information Request message received from the MME 113 to the sequence number in the Authentication Information Answer message received from the HSS 111 and determining whether or not the two sequence numbers correspond to each other (that is, comparison (1)).

In one embodiment, the invention provides a method of identifying a user specific tunnel where the network monitoring probe 13 is configured so that the input network interfaces 134 are connected to high-speed links on both the S6a and S1-MME interfaces. The input network interfaces 134 a-f are connected to the processor unit 131 and the storage unit 132, and the output network interface 133 is connected to the processor unit 131. The processor unit 131 is configured to sniff, extract and decode packets or containers traversed over S6a interface(s) and S1-MME interface(s), and to store extracted and decoded information in the storage unit 132. Furthermore, the processor unit 131 is configured to process stored information in the storage unit 132 to build a mapping table for various identity or system parameters for subscribers to enable the network monitoring probe 13 to identify user specific tunnels traversed on the user plane. Then, the processor unit 131 may decipher and track the user specific tunnels by the mapping table stored in the storage unit 132. The process unit 131 may store the mapping table for each UE in the storage unit 132. In addition, the processor unit 131 is configured to generate a report to another network entity (not shown) in the LTE network 10 via the output network interface 133.

In other embodiments extended from the above embodiments, the network monitoring probe 13 is configured to acquire other user plane identifiers of the user device 122, such as user plane eNB IP address, user plane eNB TEID, user plane S-GW IP address or user plane S-GW TEID of the user device 122. Upon a determination by the identifier comparator 318 that the eNB-UE-S1AP-ID received from the Initial Context Setup Request message over the S1-MME interface corresponds to the eNB-UE-S1AP-ID received from the Attach Request message previously received by the control plane message monitor 313, the identifier output 319 implemented by the processor unit 131 outputs one or both of the user plane identifiers (that is, the user plane S-GW TEID, the user plane S-GW IP Address, or the user plane S-GW TEID and the user plane S-GW IP Address) received from the Initial Context Setup Request message, such that the user plane identifier or identifiers are identified as a user plane identifier or identifiers of the user device 122 (that is, such that the user plane identifier or identifiers are identified with the user device identifier (that is, the IMSI) of the user device 122 received by the control plane message monitor 313 from the eNB 121.

It is envisaged that the identifier comparator 318 may alternatively compare the MME-UE-S1AP-ID received from the Initial Context Setup Request message to the MME-UE-S1AP-ID associated with the IMSI in the storage unit 132, and determine whether or not the two MME-UE-S1AP-IDs correspond to each other, and that the identifier output 319 may, upon a determination that the two MME-UE-S1AP-IDs correspond to each other, output one or both of the user plane identifiers received from the Initial Context Setup Request message, such that the user plane identifier or identifiers are identified as a user plane identifier or identifiers of the user device 122 of the user device 122 received by the control plane message monitor 313 from the eNB 121.

The user plane identifier or identifiers (that is, the user plane S-GW TEID, the user plane S-GW IP Address, or the user plane S-GW TEID and the user plane S-GW IP Address) are then output by the identifier output 319 to the CEM system 150, via the output network interface 133 of the network monitoring probe 13, for identifying data packets of the user device 122 from the eNB 121 to the S-GW 120 in the user plane (that is, on the S1-U interface between the S-GW 120 and the eNB 121) based on the user plane identifier or identifiers.

Figure 5:
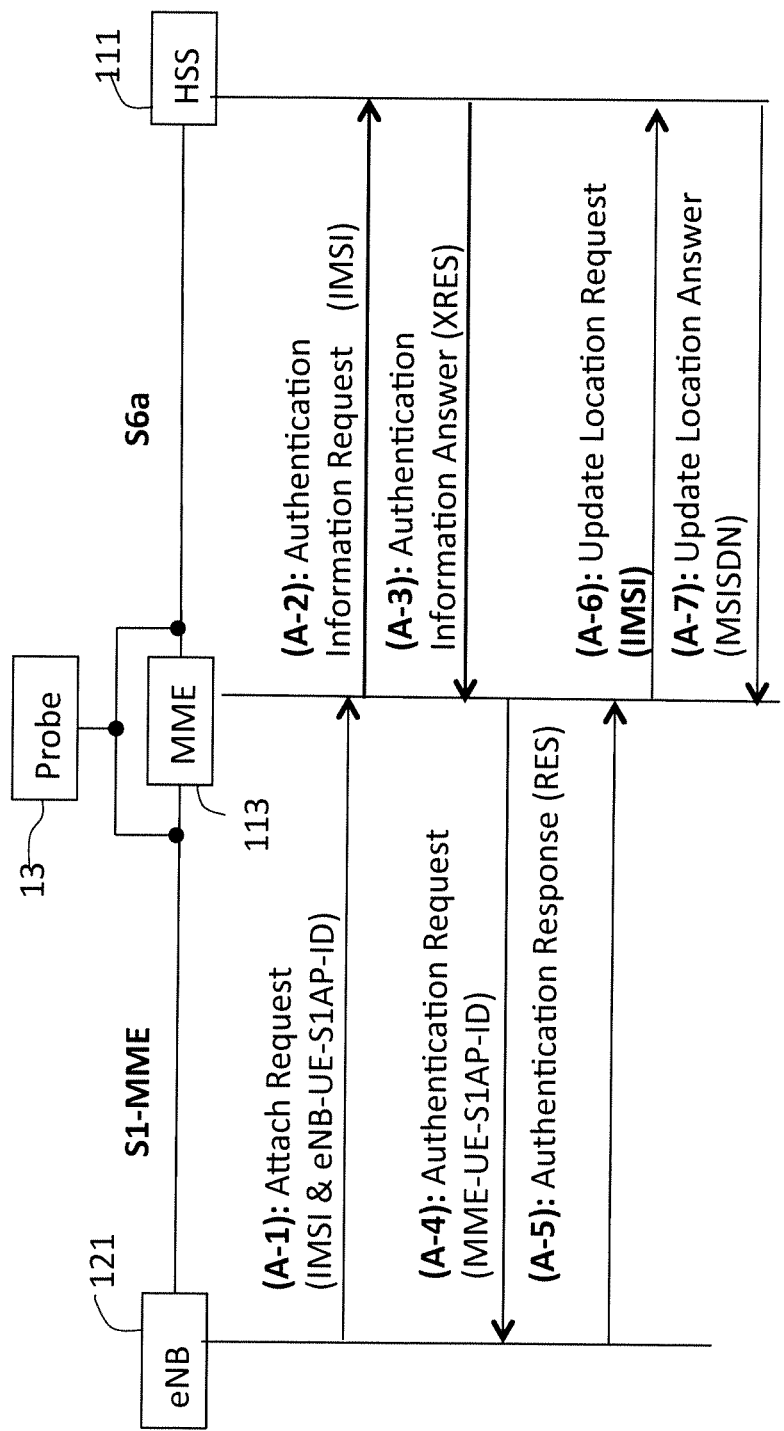
FIG. 5 is a flow diagram of a method of identifying a user device identifier of a user device 122 of a network by the network monitoring probe 13 according to one embodiment of the invention.

FIG. 5 is a flow diagram of one embodiment of a method of identifying a user device identifier of a user device 122 of a network 10 by the network monitoring probe 13. In this embodiment, the user device 122 is identified by a user device identifier in the form of an IMSI received from a control plane message in the form an Attach Request message. For clarity, the example in FIG. 5 omits other messages exchanged between the UEs and eNBs. The eNB 121, MME 113 and HSS 111 are connected as illustrated in FIG. 2. The network monitoring probe 13 is connected to at least the S6a interface between the MME 113 and the HSS 111 and the S1-MME interface between the eNB 121 and the MME 113. The network monitoring probe 13 may be configured to sniff control plane signalling/messages/containers traversed over the S6a interface 112 and the S1-MME interface 114.

At the step (A-1), the control plane message monitor 313 implemented by the processor unit 131 of the network monitoring probe 13 monitors, via an input network interface 134, e.g. one of the input network interfaces 134 a-f shown in FIG. 4, of the network monitoring probe 13, an eNB 121 (that is, an eNB 121 in communication with the user device 122) of the network 10 on the S1-MME interface between the eNB 121 and a corresponding MME 113 (that is, a MME 113 in communication with the eNB 121 in communication with the user device 122) of the network 10, for receipt of a first control plane message in the form of an Attach Request message transmitted from the eNB 121 to the MME 113. In this embodiment, the Attach Request message includes a user device identifier (that is, an identifier of the user device 122) in the form of an IMSI and a first control plane identifier in the form of an eNB-UE-S1AP-ID. Persons skilled in the art will appreciate that the Attach Request message may include other identifiers such as a control plane eNB IP address or a MME IP address.

At the step (A-2), the control plane message monitor 313 monitors, via an input network interface 134, the MME 113 on the S6a interface between the MME 113 and the HSS 111, for receipt of a second control plane message in the form of an Authentication Information Request message to the Home Subscriber Server (HSS) 111. In this embodiment, the Authentication Information Request message includes a user device identifier in the form of an IMSI of the UE 122 and a second control plane identifier in the form of a sequence number. The steps (A-1) and (A-2) occur as routine in procedures; however, the IMSI is only transmitted from the UE to the eNB at the first time attempt of attach according to 3GPP standard.

At the step (A-3), in response to receiving the second control plane message in the form of the Authentication Information Request message, the control plane message monitor 313 monitors, via an input network interface 134, the HSS 111 on the S6a interface for receipt of a third control plane message in the form of an Authentication Information Answer message to the MME 113. In this embodiment, the Authentication Information Answer message includes a third control plane identifier in the form of an expected result parameter (XRES) for authentication of the IMSI and also a fourth control plane identifier in the form of another sequence number. Upon a determination that the Authentication Information Request and the Authentication Information Answer messages are received by the control plane message monitor 313, the identifier comparator 318 compares the sequence received from the Authentication Information Answer message to the sequence received from the Authentication Information Request message previously received by the control plane message monitor 313, and determines whether or not the two control plane identifiers correspond to each other.

Upon a determination by the identifier comparator 318 that the sequence number received from the Authentication Information Answer message corresponds to the sequence received from the Authentication Information Request message previously received by the control plane message monitor 313, the identifier output 319 implemented by the processor unit 131 outputs the user device identifiers (that is, the IMSI) received from the Authentication Information Request message and the XRES in the same memory allocation, such that the user device identifier IMSI and the XRES parameter are identified as identifier or identifiers of the user device 122 (that is, such that the user plane identifier or identifiers are identified with the user device identifier (that is, the IMSI) of the user device 122 received by the control plane message monitor 313 from the eNB 121.

At the step (A-4), in response to the receiving Authentication Information Answer message, the control plane message monitor 313 monitors, via an input network interface 134, the MME 113 on the S1-MME interface, for receipt of a fourth control plane message in the form of an Authentication Request message to the eNB 121. In this embodiment, the Authentication Request message includes a fifth control plane identifier in the form of a MME-UE-S1AP-ID parameter and a sixth control plane identifier in the form of an eNB-UE-S1AP-ID. The MME 113 issues the MME-UE-S1APID parameter, and the MME-UE-S1APID parameter uniquely corresponds to the IMSI of the UE received at the step (A-1) while identifying the UE within an MME 113. The relationship between an MME-UE-S1AP-ID parameter and an UE is defined in 3GPP Technical Specifications. The eNB 121 further transmits the Authentication Request message to the UE (not shown). In general, the MME-UE-S1AP-ID parameter identifies the UE within the MME which issued the MME-UE-S1AP-ID parameter.

At the step (A-5), in response to the receiving Authentication Request message, the control plane message monitor 313 monitors, via an input network interface 134, for receipt for a fifth control plane message in the form of an Authentication Response message on the S1-MME interface to the MME 113. In this embodiment, the Authentication Response message includes a seventh control plane identifier in the form of control plane eNB-UE-S1AP-ID of the user device 122, an eighth control plane identifier in the form of control plane MME-UE-S1APID of the user device 122, and a ninth control plane identifier in the form an authentication expected result parameter (RES) generated by the user device 122 in response to the Authentication Request message.

At the step (A-5), upon the determination that Authentication Request and Authentication Response messages are received, the identifier comparator 318 may be configured to determine the control plane identifiers (e.g., the control plane eNB-UE-S1AP-ID or the control plane MME-UE-S1AP-ID) of the Authentication Request and Authentication Response messages correspond to each other. Upon a determination by the identifier comparator 318 that control plane identifiers of the Authentication Request and Authentication Response messages correspond to each other, the identifier comparator 318 continues to compare the expected result parameter (RES) received from the Authentication Response message and the un-expected result parameter (XRES) received from the Authentication Information Answer message previously received by the control plane message monitor 313, so as to determine whether the control plane eNB-UE-S1AP-ID and/or the control plane MME-UE-S1APID parameter both correspond to the IMSI of the same UE 122. Upon determination by the identifier comparator 318 that the RES parameter equals to the XRES parameter, the identifier comparator 318 determines that the control plane eNB-UE-S1AP-ID received from the Attach Request message or the Authentication Request message or the Authentication Response message and the control plane MME-UE-S1APID received from the Authentication Request and Authentication Response message correspond to the IMSI of the same UE 122.

At the step (A-5), upon the determination by the identifier comparator 318 that the control plane identifiers RES equals to the XRES, and the determination that the control plane eNB-UE-S1AP-ID received from the Attach Request message or the Authentication Request message or the Authentication Response message corresponds to the user device identifier IMSI, the identifier output 319 is adapted to output the control plane eNB-UE-S1AP-ID in the same memory allocation of the IMSI for the user device 122 in the storage unit 132. Similarly, upon the determination that the control plane identifiers RES equals to the XRES, and the determination that the control plane MME-UE-S1AP-ID received from the Authentication Request message or the Authentication Response message corresponds to the user device identifier IMSI, the identifier output 319 is adapted to output the control plane MME-UE-S1AP-ID in the same memory allocation of the IMSI for the user device 122 in the storage unit 132.

Between steps (A-5) and (A-6), other messages are exchanged between the MME 113 and the HSS 111, but they are omitted here for clarity. At the step (A-6), in response to the receiving Authentication Response message, the control plane message monitor 313 monitors, via an input network interface 134, the MME 113 for receipt of a sixth control plane message in the form an Update Location Request message to the HSS 111. In this embodiment, the Update Location Request message includes a user device identifier in the form of the IMSI of the UE 122 and a tenth control plane identifier in the form of a sequence number.

In response to receiving the Update Location Request message by the control plane message monitor 313, the identifier comparator 318 may be configured to compare the user device IMSI with the IMSI previously stored in the memory allocation for the user device 122 in the storage unit 132. Upon a determination by the identifier comparator 318 that the IMSI received from the Update Location Request message is identical to the IMSI previously stored in the memory allocation for the user device 122, the control plane message monitor 313 may be configured to determine that the Update Location Request message corresponds to the user device 122.

At the step (A-7), in response to receiving the Update Location Request message by the control plane message monitor 313, the control plane message monitor 313 monitors, via an input network interface 134 of the network monitoring probe 13, the HSS 111 for receipt of a seventh control plane message in the form of an Update Location Answer message to the MME 113. In this embodiment, the Update Location Answer message includes user plane identifier in the form of Mobile Subscriber Integrated Services Digital Network Number (MSISDN) of the UE 122 and an eleventh control plane identifier in the form of a sequence number.

In response to receiving the Update Location Answer message by the control plane message monitor 313, the identifier comparator 318 may be configured to compare the sequence numbers of the Update Location Request and Answer messages, so as to determine whether the Update Location Request and Answer messages correspond to each other. Upon a determination by the identifier comparator 318 that the sequence numbers of the above-mentioned Update Location Request and Answer messages correspond to each other, the identifier comparator 318 determines that the above-mentioned Update Location Request and Answer messages correspond to each other, and also determines that the user plane identifier MSISDN previously received from the Update Location Request and Answer message correspond to the IMSI of the user device 122.

Upon the determination that the user plane identifier MSISDN previously received from the Update Location Request and Answer message correspond to the IMSI of the user device 122, the identifier output 319 may be configured to output the MSISDN previously received from the Update Location Request and Answer message in the same memory allocation of the IMSI for the user device 122. Additionally, the identifier output 319 may be configured to output the user device identifier MSISDN along with the IMSI of the user device 122 to the CEM system 150, via the output network interface 133 of the network monitoring probe 13, for identifying control plane messages received by the control plane message monitor 313, via an input network interface 134 of the network monitoring probe 13, from a core network device in the network 10, and identifying data packets of the user device 122 from the S-GW 120 to the eNB 121 in the user plane (that is, on the S1-U interface between the S-GW 120 and the eNB 121) based on the user plane identifier or identifiers.

Figure 6:
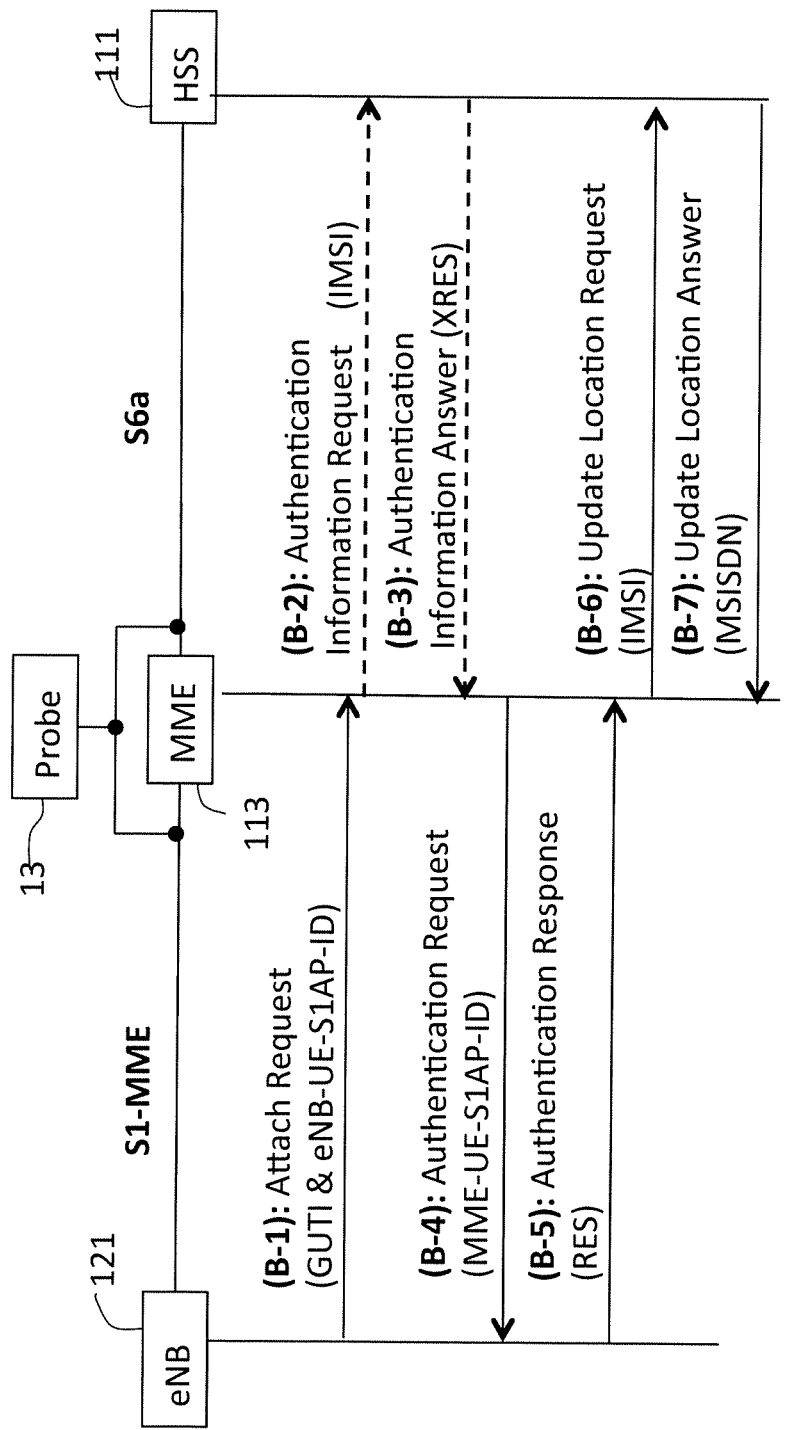
FIG. 6 is a flow diagram of a method of identifying a user device identifier of a user device 122 of a network 10 by the network monitoring probe 13 according to another embodiment of the invention.

FIG. 6 is a flow diagram of a method of identifying a user device identifier of a user device 122 of a network 10 by the network monitoring probe 13 according to another embodiment of the invention This example is similar to FIG. 5 except that a Globally Unique Temporary Identity (GUTI) of the UE 122 is transmitted in Attach Request message. At the step (B-1), the control plane message monitor 313 monitors, via an input network interface 134, the eNB 121 on the S1-MME interface for receipt of a control plane message in the form of an Attach Request message. In this embodiment, the Attach Request message includes a user device identifier in the form of the GUTI of an UE 122 and a control plane identifier in the form of an eNB-UE-S1AP-ID assigned by the eNB 121, where the Attach Request message was originally transmitted by the UE to the eNB. The eNB 121 issues the eNB-UE-S1APID parameter, and the eNB-UE-S1AP-ID uniquely corresponds to the GUTI of the UE. The relationship between an eNB-UE-S1APID parameter and the GUTI of UE is defined in 3GPP Technical Specifications.

At the step (B-2), the control plane message monitor 313 monitors, via an input network interface 134, the MME 113 on the S6a interface for receipt of a control plane message in the form of an Authentication Information Request message to the HSS 111. In this embodiment, the Authentication Information Request message includes a user device identifier in the form of an IMSI of the UE 122 and a control plane identifier in the form of a sequence number for the HSS 111 authenticating the user device 122. It should be envisaged that the GUTI is previously received from the Attach Request message at the step (B-1) by the control plane message monitor 313, but the identifier comparator 318 cannot determine the GUTI corresponds to the IMSI received at the step (B-2) since there is no record or prior knowledge they correspond to each other for the same user device 122.

At the step (B-3), in response to the Authentication Information Request message received by the control plane message monitor 313, the control plane message monitor 313 monitors, via an input network interface 134, the HSS 111 on the S1-MME interface for receipt of an Authentication Information Answer message to the MME 113. In this embodiment, the Authentication Information Answer message includes a control plane identifier in the form of an un-expected response XRES parameter and another control plane identifier in the form of a sequence number. Upon a determination that the Authentication Information Answer message is received by the control plane message monitor 313, the identifier comparator 318 is configured to compare the sequence numbers received respectively from the Authentication Information Request message and the Authentication Information Answer message. Upon a determination that the sequence numbers received from the Authentication Information Request message and Authentication Information Answer message correspond to each other, the identifier comparator 318 is configured to determine that the Authentication Information Request message and Authentication Information Answer message correspond to each other. It should be noted that the steps (B-2) and (B-3) can be optional steps in the second embodiment.

At the step (B-4), the control plane message monitor 313 monitors, via an input network interface 134, the MME 113 on the S6a interface for receipt of a control plane message in the form of an Authentication Request message to the HSS 111. In this embodiment, the Authentication Request message includes another user device identifier in the form of an IMSI of the UE 122 and a control plane identifier in the form of control plane eNB-UE-S1AP-ID and another control plane identifier in the form of control plane MME-UE-S1AP-ID of the user device 122.

In this embodiment, at the step (B-4), upon receiving the Authentication Request message by the control plane message monitor 313, the identifier comparator 318 is configured to compare the control plane eNB-UE-S1AP-ID received from the Authentication Request message at the step (B-4) to the control plane eNB-UE-S1AP-ID received from the Attach Request message at the step (B-1), and determines whether the control plane eNB-UE-S1AP-ID received from the above-mentioned Attach Request and Authentication Request messages correspond to each other.

Upon a determination by the control plane message monitor 313 that the control plane eNB-UE-S1AP-ID received from the Authentication Request message received at the step (B-4) by the control plane message monitor 313 corresponds to the control plane eNB-UE-S1AP-ID received from the Attach Request message previously received at the step (B-1) by the control plane message monitor 313, the identifier comparator 318 determines that the Attach Request message received at the step (B-1) corresponds to the Authentication Request message received at the step (B-4), and the identifier output 319 outputs the control plane identifier eNB-UE-S1AP-ID received from the Attach Request message at the step (B-1) and the control plane identifier MME-UE-S1AP-ID received from Authentication Request message at the step (B-4) in the same memory of the user device identifier IMSI for the user device 122, such that control plane identifiers eNB-UE-S1AP-ID and MME-UE-S1AP-ID are identified as the control plane identifiers of the user device 122.

At the step (B-5), in response to the Authentication Request message received by the control plane message monitor 313, the control plane message monitor 313 monitors, via an input network interface 134, the eNB 121, for receipt of a corresponding Authentication Response message to the MME 113. In this embodiment, the Authentication Response message includes a user device identifier in the form of an expected response RES parameter, another control plane identifier in the form of a control plane eNB-UE-S1AP-ID and another control plane identifier in the form of control plane MME-UE-S1AP-ID. At the step (B-5), the identifier comparator 318 compares the expected result RES parameter and the un-expected result XRES parameter to determine whether the eNB-UE-S1AP-ID parameter and the MME-UE-S1APID parameter both correspond to the user device identifier IMSI received from the Authentication Information Request message at the step (B-2), or to determine whether the eNB-UE-S1AP-ID parameter and the MME-UE-S1AP-ID parameter both correspond to the user device identifier GUTI of the same UE 122 received from the Attach Request message at the step (B-1). If the identifier comparator 318 determines that the RES parameter equals to the un-expected result XRES, then the identifier comparator 318 determines that the control plane eNB-UE-S1AP-ID parameter and the control plane MME-UE-S1AP-ID parameter both correspond to the user device identifier GUTI of the same UE 122 within the currently serving eNB 121 and the currently serving MME 113, and also determines that user device identifier GUTI corresponds to the user device identifier IMSI received from the Authentication Information Request message at the step (B-2).

Alternatively, the identifier comparator 318 at the step (B-4) compares the control plane eNB-UE-S1AP-ID received from the Authentication Request message at the step (B-4) to the control plane eNB-UE-S1AP-ID received from the Attach Request message at the step (B-1), and determines the control plane MME-UE-S1AP-ID received from the Authentication Request message at the step (B-4) corresponds to the GUTI when the control plane eNB-UE-S1AP-ID received from the Authentication Request message at the step (B-4) corresponds to the control plane eNB-UE-S1AP-ID received from the Attach Request message at the step (B-1). Upon a determination that identifier comparator 318 determines the control plane MME-UE-S1AP-ID received from the Authentication Request message at the (B-4) corresponds to the GUTI, the identifier output 319 at the step (B-5) outputs the control plane eNB-UE-S1AP-ID and the control plane MME-UE-S1AP-ID to the same memory allocation of the user device IMSI for the same user device 122, so as to identify the control plane identifiers eNB-UE-S1AP-ID and MME-UE-S1AP-ID as the control plane identifiers of the user device 122.

Between the steps (B-4) and (B-5), other messages are exchanged between the MME 113 and the HSS 111, but they are omitted here for clarity. Subsequent steps (B-6) and (B-7) are similar to the above-mentioned steps (A-6) and (A-7) of FIG. 5, and the details of the processing by the control plane message monitor 313, the identifier comparator 318 and the identifier output 319 can be referred to corresponding descriptions of the steps (A-6) and (A-7).

Figure 7:
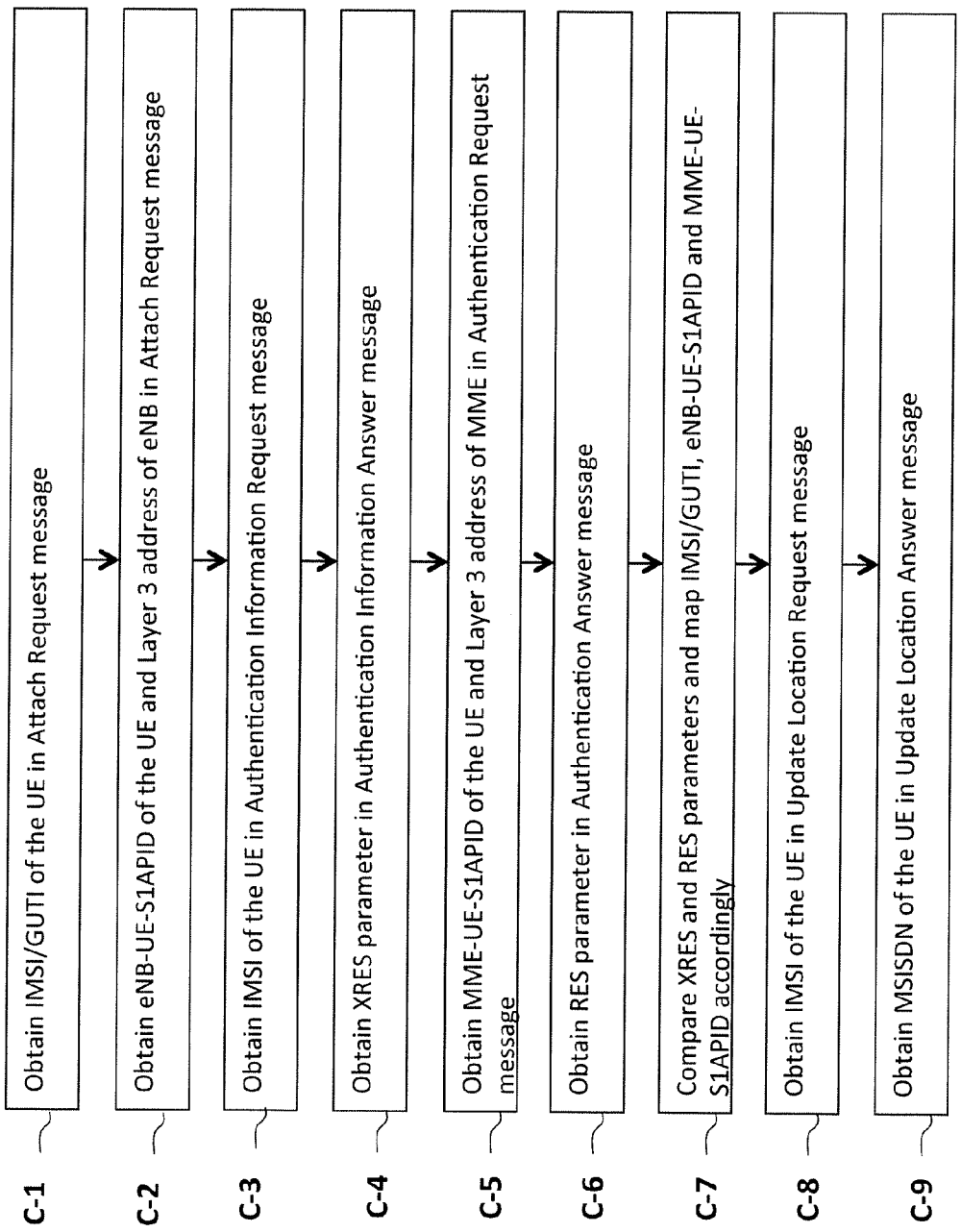
FIG. 7 is a flowchart of the method of identifying user specific tunnels according to one embodiment of the invention.
Figure 8:
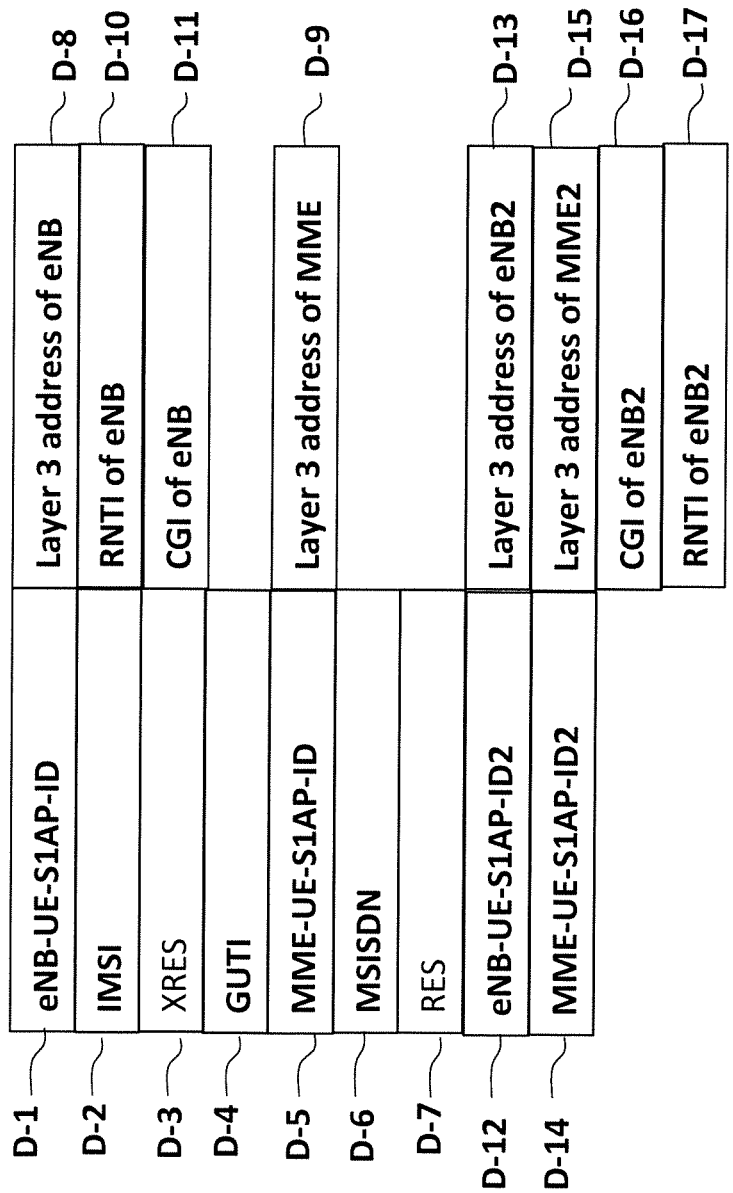
FIG. 8 illustrates a data configuration for storing parameters identifying user specific tunnels according to one embodiment of the invention.

FIG. 7 is flowchart of the method of identifying user specific tunnels traversed on a user-plane in the LTE network according to an embodiment of the invention. FIG. 8 illustrates a data configuration for storing parameters identifying user specific tunnels according to an embodiment of the invention. As shown in FIG. 7, the memory allocations in the network monitoring probe 13 are configured for storing identifier parameters specific to tunnels related to the UEs. There are several fields in the storage unit 132 of the network monitoring probe 13, and the fields are configured for storing different identifier parameters to be extracted in the message exchanges processes shown in FIG. 5 or 6. Since an IMSI/GUTI is not always transmitted in control plane signalling/messages, the first and second embodiment of the invention provides a method for identifying user specific tunnels on the control plane. Once the user specific tunnels traversed on the control plane are identified, the network monitoring probe 13 determines if the connection associated with the specific UE is still maintained; and if so, information extracted from the control plane signalling/messages/containers is further used to correlate directional traffic flows traversed over the user plane.

Referring to FIGS. 2 to 8, a method for identifying user specific tunnels according to an embodiment starts at the step C-1, when the control plane message monitor 313 of the network monitoring probe 13 receives an Attach Request message over a S1-MME interface. The control plane message monitor 313 then extracts, decodes and obtains the IMSI/GUTI from the Attach Request message, and stores the IMSI/GUTI in fields D-2/D-4 in memory allocation for this particular UE 122. In the invention, the control plane message monitor 313, the identifier comparator 318 and/or the processor unit 131 may establish memory allocation for each UE for which the control plane signalling/messages/containers are sniffed, extracted and decoded.

At the step C-2, in the same Attach Request message, the control plane message monitor 313 extracts, decodes and obtains a control plane eNB-UE-S1AP-ID of the UE 122 and control plane Layer 3 address of the eNB (which is the current serving cell eNB 122); then the control plane message monitor 313 stores this eNB-UE-S1AP-ID parameter in field D-1, and stores the control plane Layer 3 address parameter of the eNB 122 in field D-8. Here, the control plane Layer 3 address of the eNB 122 may be, for instance, an IP address of the eNB 122. Additionally, the tuple of the control plane eNB-UE-S1AP-ID and the control plane TEID can uniquely identify the user device 122 within the eNB 122.

At the step C-3, when the control plane message monitor 313 receives Authentication Information Request message over S1-MME interface, the control plane message monitor 313 extracts, decodes and obtains the IMSI from the Attach Request message, and stores the IMSI of the user device 122 in fields 702 in memory allocation 70 for this particular UE 122. If a user device identifier IMSI of the user device 122 is stored previously in the memory allocation of the storage unit 132, the identifier comparator 318 only compares the IMSI obtained recently with the IMSI stored previously. If the user device identifier GUTI of the user device 122 but not a IMSI is received previously, the IMSI received recently by the control plane message monitor 313 may be stored in the memory allocation D-2 if it is determined that such user device IMSI corresponds to the user device GUTI stored for the user device 122 in the storage unit 132.

At the step C-4, when the control plane message monitor 313 receives an Authentication Information Answer message over S6a interface, the control plane message monitor 313 extracts, decodes, and obtains an XRES parameter from the Authentication Information Answer message, and then stores the XRES parameter in field D-3, when the identifier comparator 318 determines that the Authentication Information Answer message received at the step C-3 corresponds to the Authentication Information Request message received at the step C-4.

At the step C-5, when the control plane message monitor 313 receives an Authentication Request message over the S1-MME interface, the control plane message monitor 313 extracts, decodes and obtains the control plane MME-UE-S1AP-ID and stores the Layer 3 address parameter of the MME 113 from the Authentication Request message after the identifier comparator 318 determines that the Authentication Request message corresponds to the Attach Request message received at the step C-1; then stores the MME-UE-S1AP-ID in field D-5 and the Layer 3 address of the MME in field D-9 in memory allocation for this particular UE 122. Additionally, the tuple of the control plane MME-UE-S1AP-ID and the control plane IP address of the MME 113 corresponding to the user device 122 can uniquely identify the user device 122 within the MME 113.

At the step C-6, when the control plane message monitor 313 131 receives an Authentication Response message over the S1-MME interface, the control plane message monitor 313 extracts, decodes, and obtains expected response (RES) parameter from the Authentication Response message, and stores the RES parameter in field D-7 in memory allocation for this particular UE 122, after the identifier comparator 318 determines that the Authentication Response message corresponds to the Authentication Request message received at the step C-5.

At the step C-7, the identifier comparator 318 compares the RES in field D-7 and the XRES parameter in field D-3, and determines whether the RES in field D-7 equals to the XRES parameter in field D-3. If the identifier comparator 318 determines that the RES parameter in field D-7 equals to the XRES parameter in field D-2, then the identifier comparator 318 can determine that the control plane eNB-UE-S1AP-ID or the control plane eNB IP address or the control plane eNB TEID extracted in the step C-3 and the control plane MME-UE-S1AP-ID or the control MME IP address or the control plane MME TEID extracted in the step C-5 correspond to the IMSI/GUTI of the same UE 122. Furthermore, the identifier output 319 maps IMSI/GUTI, the control plane eNB-UE-S1AP-ID/control plane eNB TEID/control plane eNB IP address and the control plane MME-UE-S1AP-ID/control plane eNB TEID/control plane eNB IP address accordingly for the UE 122 in the same memory location.

At the step C-8, when the control plane message monitor 313 receives an Update Location Request message over S6a interface, the control plane message monitor 313 extracts, decodes and obtains a user device identifier IMSI parameter from the Update Location Request message, and then identifier comparator 318 compares the recently obtained user device identifier IMSI with the IMSI parameter previously stored in field D-2. Upon a determination by the identifier comparator 318 that the IMSI stored in the field D-2 is identical to the user device identifier IMSI recently obtained by the control plane message monitor 313, control plane message monitor 313 is configured to monitor the HSS 111 for receipt of a corresponding Update Location Answer message over S6a interface.

At the step C-9, when the control plane message monitor 313 receives an Update Location Answer message over S6a interface, the control plane message monitor 313 extracts, decodes and obtains a user device identifier MSISDN parameter from the Update Location Request message, and then stores the MSISDN parameter in field D-6, after the identifier comparator 318 determines the Update Location Answer message received at the step C-9 corresponds to the Update Location Request message received at the step C-8. At the step C-9, the network monitoring probe 13 is able to establish a relationship between the user device identifiers IMSI-GUTI-MSISDN for control plane signalling/messages/containers related to the same UE 122 traversed on control plane in the LTE network 10. Even if the control plane signalling/messages/containers traversed in the LTE network 10 do not carry IMSI or GUTI messages, the control plane identifiers and the user device identifiers related to the same UE 122 stored in the memory allocation in the storage unit 132, the network monitoring probe 13 is still able to identify the user specific tunnels in control plane when the MSISDN is found in the control message(s).

With the user device identifiers IMSI, GUTI, MSISDN stored in the same memory allocation for the same user device 122, using the control plane identifiers eNB-UE-S1AP-ID and MME-UE-S1AP-ID for the user device 122, future control plane messages traversing over the S1-MME interface can be traced and correlated by the network monitoring probe 13 back to the user device identifier IMSI of the user device 122. Furthermore, the user device identifiers RES and XRES parameters corresponding to UE(s) are stored in memory only for a short duration and released when a match is found so that memory is free to be reused for a different IMSI. For instance, for the UE 122, the RES and XRES parameters may be stored in fields D-3 and D-7 of the memory allocation shown in FIG. 8.

Figure 9:
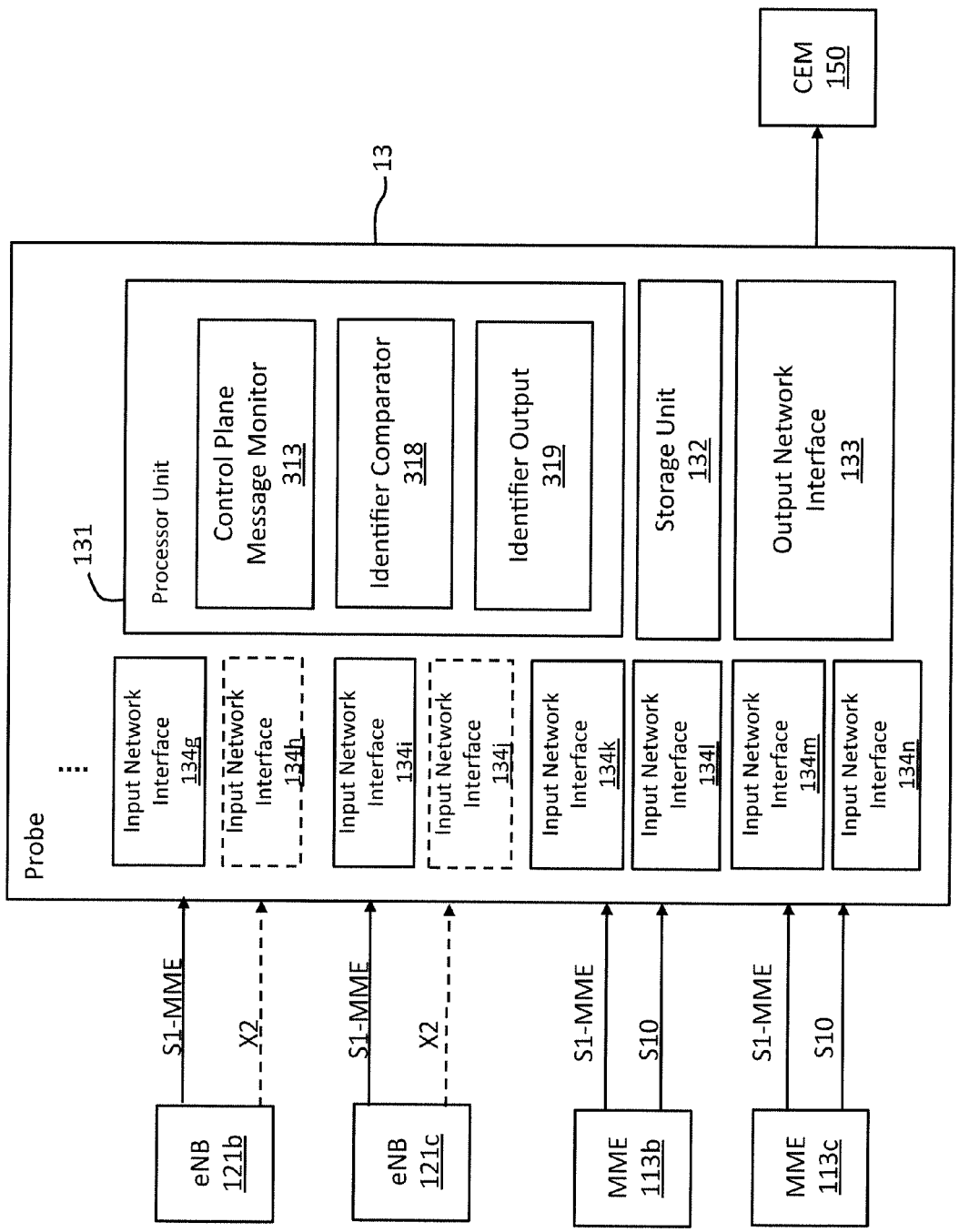
FIG. 9 is a schematic diagram of the functional components of the network monitoring probe 13 for identifying the user plane identifier of a user device 122 of the network according to another embodiment.

FIG. 9 is a schematic diagram of the functional components of the network monitoring probe 13 for identifying the user plane identifier of a user device 122 of the network 10 according to another embodiment. In this embodiment, the network monitoring probe 13 includes all or some of the functional elements shown in FIG. 4 but also includes additional Input Interfaces (or Input Network Interfaces) 134g, 134h, 134i, 134j, 134k, 134l, 134m, 134n respectively connected to the eNB 121b, the eNB 121c, the MME 113b, the MME 113c on the S1-MME interfaces, the X2 interfaces or the S10 interfaces. In this embodiment, the functional components are software modules implemented by the processor unit 131 of the network monitoring probe 13. However, persons skilled in the art will appreciate that one or more of the functional components could alternatively be implemented in some other way, for example, by one or more dedicated electronic circuits.

The network monitoring probe 13 can be configured to identify change of control plane identifiers for the user device 122, when the user device 122 moves from a radio service coverage of the eNB 121b to that of the eNB 121c, there may be two types of activities triggered by such movement. When the user device 122 is in idle state, the UE 122 may perform a Tracking Area Update (TAU); when the user device 122 is in connected state, the UE 122 may perform S1-based Handover (Handover) and during such handover, the serving MME is changed from a previously serving MME 113b to MME 113c. In the following descriptions corresponding to FIG. 10, the method for tracking user specific tunnels in the LTE network is illustrated for S1-based Handover scenario.

Figure 10:
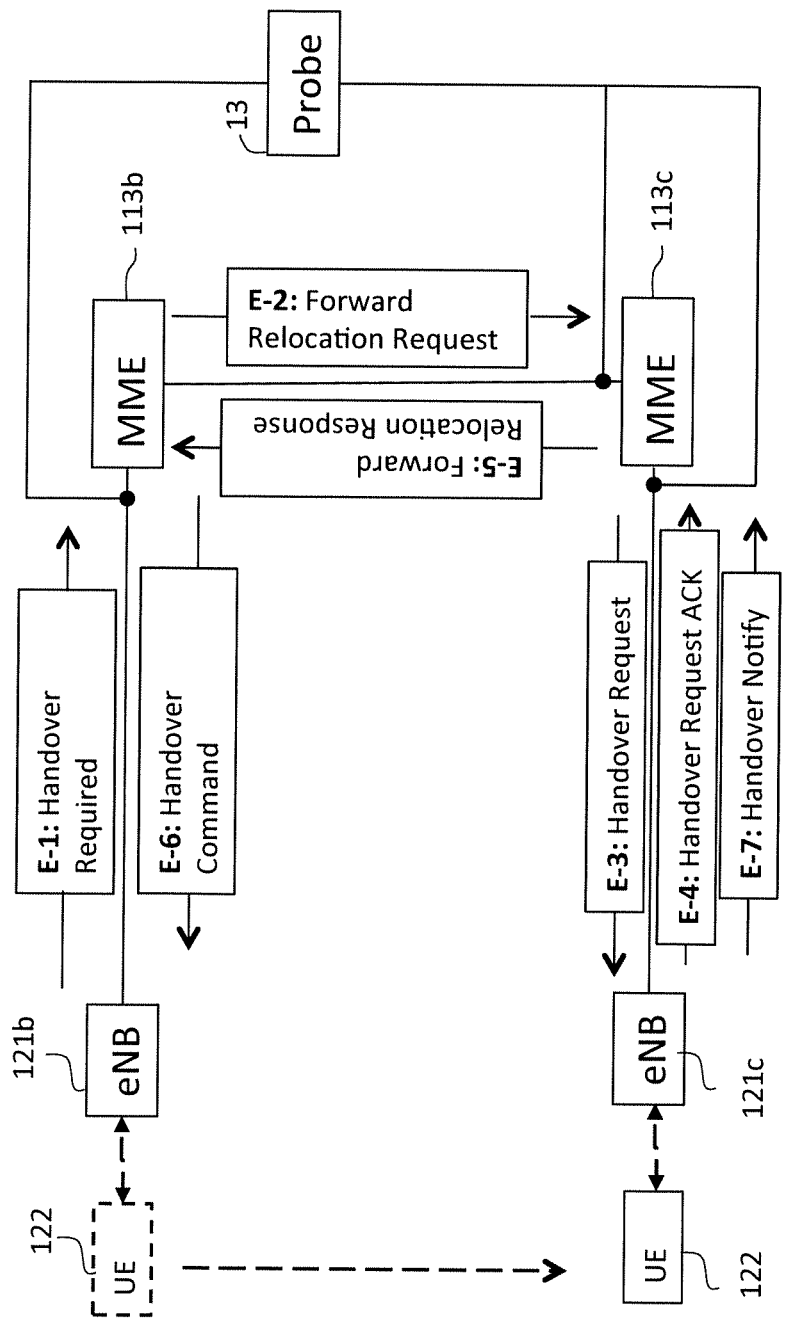
FIG. 10 illustrates control plane message exchanges between eNBs and MMEs in the LTE network according to the first embodiment of the invention.

FIG. 10 illustrates control plane message exchanges between eNBs 121b, 121c and MMEs 113b, 113c in the network 10b according to a first embodiment of the invention. The message exchanges between the eNB 121b and the MME 113b, between the MME 113b and the MME 113c and between the MME 113c and the eNB 121c are results of the UE 122 moving from the coverage of the eNB 121b to the eNB 121c. The S1-MME interfaces between the eNB and the MME and the S10 interface between the MMEs are not shown in FIG. 10 for clarity. However, a person with ordinary skill in the current field may understand the control plane messages are exchanged over the relevant interfaces as shown in FIG. 2.

Referring to both FIGS. 2 and 10, when the UE 122 moves from the radio service coverage of the eNB 121b to the eNB 121c, the source eNB 121 triggers a handover for the UE 122. At the step E-1, the source eNB 121b transmits a Handover required message over the S1-MME interface to the source MME 113b. Here, the monitoring probe 13 is also connected to the S1-MME interface between the source eNB 121b and the source MME 113b, and the control plane message monitor 313 monitors the eNB 121b, via an input network interface 134 of the monitoring probe 13, for receipt of the control plane message in the form of the Handover required message.

[First Embodiment for Tracking User Specific Tunnels when User Performs S1-Handover in LTE Network]

In the invention, there is proposed a method for tracking user specific tunnels in S1-based Handover scenario. Prior to the step E-1, the control plane message monitor 313 of the monitoring probe 13 may acquire parameters, control plane identifiers, user device identifiers and/or user plane identifiers corresponding to the UE 122 similar to procedures of FIGS. 5-8, and the parameters corresponding to the UE 122 may include IMSI, the control plane eNB-UE-S1AP-ID, the control plane IP address of the currently serving eNB 121b, the control plane MME-UE-S1AP-ID, the control plane IP address of the currently serving MME 113b, the control plane TEID of eNB 121b, the control plane TEID of the MME 113c and so forth. Since the UE 122 is originally in a connected state, the control plane message monitor 313 of the monitoring probe 13 also acquires the CGI and RNTI of the currently serving eNB 121b. The CGI and RNTI of the currently serving eNB 121b may be stored by the control plane message monitor 313 or the identifier comparator 318 or the identifier output 319 in a memory allocation similar to that shown in FIG. 8.

Referring to FIG. 8, the monitoring probe 13 may store the CGI of the currently serving eNB 121b in field D-1 in the memory allocation for the UE 122, when the UE 122 enters the connected state. The CGI of the currently serving eNB 121b may be acquired from the RRC Connected Reconfiguration message transmitted from the eNB 121b to the MME 113b over the S1-MME interface before the handover of the UE 122 occurs.

In general, the control plane message monitor 313 of the Probe 13 may sniff hundreds of Handover Required messages over multiple S1-MME interfaces connected to a plurality of MMEs within just one second, and may also sniff hundreds of Forward Relocation Request messages over S10 interfaces between the plurality of MMEs within one second. All these Handover Required messages and Forward Relocation Request messages may contain great amount of information. Therefore, differentiating a Handover Required message and determining such Handover Required message is related to which Forward Relocation Request message from other similar type of messages will become a difficult task of the identifier comparator 318 of the monitoring probe 13 since the monitoring probe 13 cannot query any MME in the network 10b to obtain the identity information stored in the MME.

When the UE 122 moves from the radio service coverage of the currently serving eNB 121b to that of another eNB 121c, the control plane message monitor 313 monitors, via an input network interface 134, the eNB 121b, for receipt of the control plane message in the form of a Handover Required message in the step E-1. Once the control plane message monitor 313 obtains the Handover Required message, the control plane message monitor 313 further extracts and decodes a source to target transparent container field and a Target-ID field in the Handover Required message. Furthermore, the control plane message monitor 313 extracts a user device identifier RNTI parameter in a Source UE-identity field in the source to target Transparent Container field, and obtains the RNTI of the source eNB 121b. Furthermore, the control plane message monitor 313 may further look for a CGI parameter in a Last Visited Cell field in the source to target transparent container field of the same Handover Required message. If the identifier comparator 318 determines that a CGI parameter in the Last Visited Cell field of the Handover Required message contains the same value as the CGI of the source eNB 121b as the CGI of the eNB 121b had been stored in the memory allocation for the user device 122, then the identifier comparator 318 determines to map the recently obtained user device identifier RNTI parameter to the CGI of the currently serving eNB 121b for the UE 122. Furthermore, the identifier comparator 318 searches through the memory allocations of UEs in the storage unit 132, and the identifier output 319 outputs the user device identifier RNTI and CGI directly associated with the control plane eNB-UE-S1AP-ID and the control plane MME-UE-S1AP-ID stored in the memory allocation for the user device 122. At this instance, the identifier output 319 may store the user device identifier RNTI of the source eNB 121b in field D-10 of the memory allocation for the user device 122.

Up to this instance, the user device identifier RNTI and the control plane identifier CGI of the source eNB 121b obtained in the Handover Required message at the step E-1 is directly mapped to the user device identifier IMSI of the UE 122. Also, the user device identifier RNTI and the control plane identifier CGI of the source eNB 121b will be used by the identifier comparator 318 to locate the Forward Relocation Request message related to the UE 122, and differentiate the Handover Request messages obtained over the S1-MME interface between the target eNB and the target MME. Additionally, the Probe 13 may also obtain the control plane identifier CGI of the target eNB 121c in the Target-ID field of the Handover Required message. In order to track the user specific tunnels in the network 10, the identifier output 319 may temporarily store the control plane identifier CGI of the target eNB 121c in field D-16 (which shows CGI of eNB2) of the memory allocation for the UE 122.

At the step E-2, control plane message monitor 313 monitors, via an input network interface 134, the source MME 113b for receipt of a control plane message in the form of the Forward Relocation Request message on the S10 interface transmitted to the target MME 113c. In this embodiment, for the Forward Relocation Request message includes the user device identifier IMSI of the user device 122. Initially, the Probe 13 marks the IMSI of the user device 122 in each Forward Relocation Request message, and stores the marked IMSI parameter in temporary memory allocation. If the identifier comparator 318 determines the user device identifier IMSI of the UE 122 is carried in the Forward Relocation Request message, the identifier comparator 318 can directly determine that the Forward Relocation Request message is directly associated with the UE 122. Since the control plane message monitor 313 obtains the Handover Required message previously at the step E-1, the user device identifier RNTI of the source eNB 121b is obtained from the Handover Required message and thus the control plane message monitor 313 determines to map RNTI and CGI of the source eNB 121b to the user device identifier IMSI/GUTI of the user device 122, and further store these identifiers in the same memory allocation for the UE 122. Additionally, the identifier comparator 318 can determine that the Forward Relocation Request message is directly related to the Handover Required message as well.

At the step E-3, the control plane message monitor 313 monitors, via an input network interface 134, the target MME 113c for receipt of a control plane message in the form of a Handover Request message over a S1-MME interface between the target MME 115 corresponding to the UE 122 according to the user device identifier RNTI of the UE 122 previously stored in the memory allocation for the UE 122. The control plane message monitor 313 may extract and decode Handover Request messages and thus obtain the RNTI in each Handover Request message transmitted from the MME 113c over the S1-MME interface. Also, the control plane message monitor 313 may obtain a CGI parameter in a Last Visited Cell field in the source to target Transparent Container field of each Handover Request message. Then, the identifier comparator 318 checks the control plane identifier CGI and the user device identifier RNTI obtained from each Handover Request message. For instance, the Probe 13 may compare the CGI and RNTI obtained from each Handover Request message to what had been stored in the memory allocations for UEs in the storage unit 132. If the identifier comparator 318 determines one Handover Request message contains the control plane identifier CGI and the user device identifier RNTI identical to those stored in the fields D-10 and D-11 for the UE 122, then the identifier comparator 318 determines that this Handover Request message is directly associated with the UE 122, and thus differentiate the particular Handover Request message from other Handover Request messages.

In the Handover Request message determined by the identifier comparator 318 to be directly associated with the UE 122, the control plane message monitor 313 also obtains the control plane MME-UE-S1AP-ID corresponding to the target MME 113c. Here, the MME-UE-S1AP-ID2 parameter may be stored as the control plane MME-UE-S1AP-ID of the target MME 113c for the UE 122. The identifier output 139 may also temporarily store the control plane MME-UE-S1APID of the target MME 113c in field D-14 of the memory allocation for the UE 122. The control plane MME-UE-S1APID2 shown in FIG. 8 is an identity parameter assigned by the target MME 113c to the UE 122, and the control plane MME-UE-S1AP-ID2 uniquely identifies the UE 122 within the management of the MME 113c.

At the step E-4, the control plane message monitor 313 monitors, via an input network interface 134, the target MME 113c for receipt of a control plane message in the form of a Handover Request ACK message transmitted by the target eNB 121c, the control plane message monitor 313 finds the MME-UE-S1AP-ID2 parameter stored in the configured memory allocation for the UE 122 is corresponding to the target MME 113c, and the control plane message monitor 313 also obtain the eNB-UE-S1AP-ID2 corresponding to the target eNB 121c. Here, the eNB-UE-S1APID2 parameter stored in the configured memory allocation for the UE 122 may be called a target eNB-UE-S1AP-ID parameter for the UE 122. Since the monitoring probe 13 previously obtains the MME-UE-S1AP-ID2 parameter corresponding to the target MME 113c, the identifier output 319 of the monitoring probe 13 may map the eNB-UE-S1AP-ID2 parameter to the MME-UE-S1AP-ID2 parameter, and thus temporarily store the eNB-UE-S1AP-ID2 parameter in field D-12 of the configured memory allocation for the UE 122. It should be noted that the "eNB-UE-S1AP-ID2" parameter is an identity parameter assigned by the target eNB 121c to the UE 122, and eNB-UE-S1AP-ID2 uniquely identifies the UE 122 within the radio service coverage of the eNB 121c.

At the step E-4, in the same Handover Request ACK message, the control plane message monitor 313 may extract, decode and obtain a New UE-identity field in the target to source transparent container (information element) field of the Handover Request ACK message. In the New UE-identity field, the control plane message monitor 313 may further obtain the user device identifier RNTI of the UE 122 assigned by the target eNB 121c, and thus the identifier output 319 may store the RNTI of the target eNB 121c in field D-16 (which shows RNTI of the eNB2) of the configured memory allocation for the UE 122.

Persons with ordinary skills in the art can understand that, the Handover Request message traversed over the S1-MME interface from the target MME 113c may also include control plane layer 3 addresses such as the control plane IP address of the target eNB 121c and the control IP address of the target MME 113c. Therefore, the monitoring probe 13 may also temporarily store the control plane IP address of the target eNB 121c in field D-13 (which shows control plane Layer 3 address of eNB2) and store the control IP address of the target MME 113c in field D-15 (which shows control plane Layer 3 address of MME2). Also, the monitoring probe 13 had previously stored the control plane IP address of the source eNB 121b and the control plane IP address of the source MME 113b in the configured memory allocation for the UE 122. Therefore, the identifier comparator 318 of the monitoring probe 13 may clearly determine the following Handover Request ACK message is directly corresponding to the UE 122 if the identifier comparator 318 determines that the eNB-UE-S1AP-ID parameter and its corresponding control plane layer 3 address obtained by the control plane message monitor 313 from the Handover Request ACK message are respectively identical to those temporarily stored in the fields D-12 and D-13, and the identifier comparator 318 also determines that the MME-UE-S1AP-ID parameter and its corresponding control plane layer 3 address obtained by the control plane message monitor 313 from the and over Request ACK message are respectively identical to those temporarily stored in the fields D-14 and D-15.

At the step E-5, the control plane message monitor 313 monitors, via an input network interface 134, the target MME 113c on the S10 interface for receipt of a control plane message in the form of a Forward Relocation Response message to the source MME 113b. The identifier comparator 318 determines the Forward Relocation Response message is directly corresponding to the UE 122 if the identifier comparator 318 determines that the MME-UE-S1AP-ID of the source MME 113b and its corresponding control plane layer 3 address are respectively identical to those temporarily stored in the fields D-5, and D-9. As such, the identifier comparator 318 also determines that the MME-UE-S1AP-ID parameter of target MME 113c and its corresponding control plane layer 3 address are respectively identical to those temporarily stored in the fields D-14 and D-15.

At the step E-6, the control plane message monitor 313 monitors, via an input network interface 134, the source MME 113b on the S1-MME interface for receipt of a control plane message in the form of a Handover Command message to the source eNB 121b. The identifier comparator 318 may also determine the Handover Command message is directly corresponding to the UE 122 if the identifier comparator 318 determines that the MME-UE-S1AP-ID parameter of the source MME 113b and its corresponding control plane layer 3 address obtained by the control plane message monitor 313 from the Handover Command message are respectively identical to those temporarily stored in the fields D-5, D-9, and the identifier comparator 318 also determines that the eNB-UE-S1AP-ID parameter of the source eNB 121b and its corresponding control plane layer 3 address are respectively identical to those temporarily stored in the fields D-1, D-8.

At the step E-7, the control plane message monitor 313 monitors, via an input network interface 134, the target eNB 121c on the S1-MME interface for receipt of a control plane message in the form of a Handover notify message to the target MME 113c. The identifier comparator 318 may determine the Handover notify message is directly corresponding to the UE 122 if the identifier comparator 318 determines that the MME-UE-S1AP-ID parameter of target MME 113c and its corresponding control plane layer 3 address obtained by the control plane message monitor 313 from the Handover notify message are respectively identical to those temporarily stored in the fields D-14 and D-15, and the Probe 13 also determines that the eNB-UE-S1AP-ID parameter of the target eNB 112c and its corresponding control plane layer 3 address obtained by the control plane message monitor 313 from the Handover notify message are respectively identical to those temporarily stored in the fields D-12 and D-13.

By simultaneously comparing the control plane MME-UE-S1AP-ID parameter and the control plane IP address in a control plane message/container traversed in the network 10 with what had been stored for a particular MME entity, the identifier comparator 318 can reduce the probability of sniffing wrong control plane message(s) corresponding to a particular UE. Similarly, by simultaneously comparing the control plane eNB-UE-S1AP-ID parameter and the control plane IP address in a control plane message/container traversed in the network 10 with what had been stored for a particular eNB entity, the identifier comparator 318 can reduce the probability of sniffing wrong control plane message(s) corresponding to a particular UE.

At the step E-7, the UE 122 completes the handover to the target eNB 121c, and thus may not need the parameters of the previous serving eNB 121b. Therefore, the identifier output 319 of the network monitoring probe 13 may respectively replace those of the previous serving eNB 121b in the configured memory allocation for the UE 122 by all parameters of the new serving eNB 121c. For instance, the identifier output 319 replaces the field D-1 with the field D-12, replaces the field D-8 with the field D-13, replaces the field D-10 with the field D-16, replaces the field D-5 with the field D-14, and replaces the field D-9 with the field D-5. Finally, the identifier output 319 may reset all temporary fields such as the fields D-12 to D-17 of the configured memory allocation of the UE 122 for future use.

Since the control plane message monitor 313 may also obtain a new CGI of the new serving eNB 121c, and thus the identifier output 319 may replace the field D-11 with the new CGI which may be temporarily stored in field D-17. The control plane message monitor 313 may also obtain GUTI from the new serving eNB 121c, and thus the identifier output 319 may replace the old value of GUTI stored in the field D-4 with the new GUTI assigned by the new serving eNB 121c.

[Second Embodiment for Tracking User Specific Tunnels when User Performs X2-Handover in LTE Network]

Figure 11:
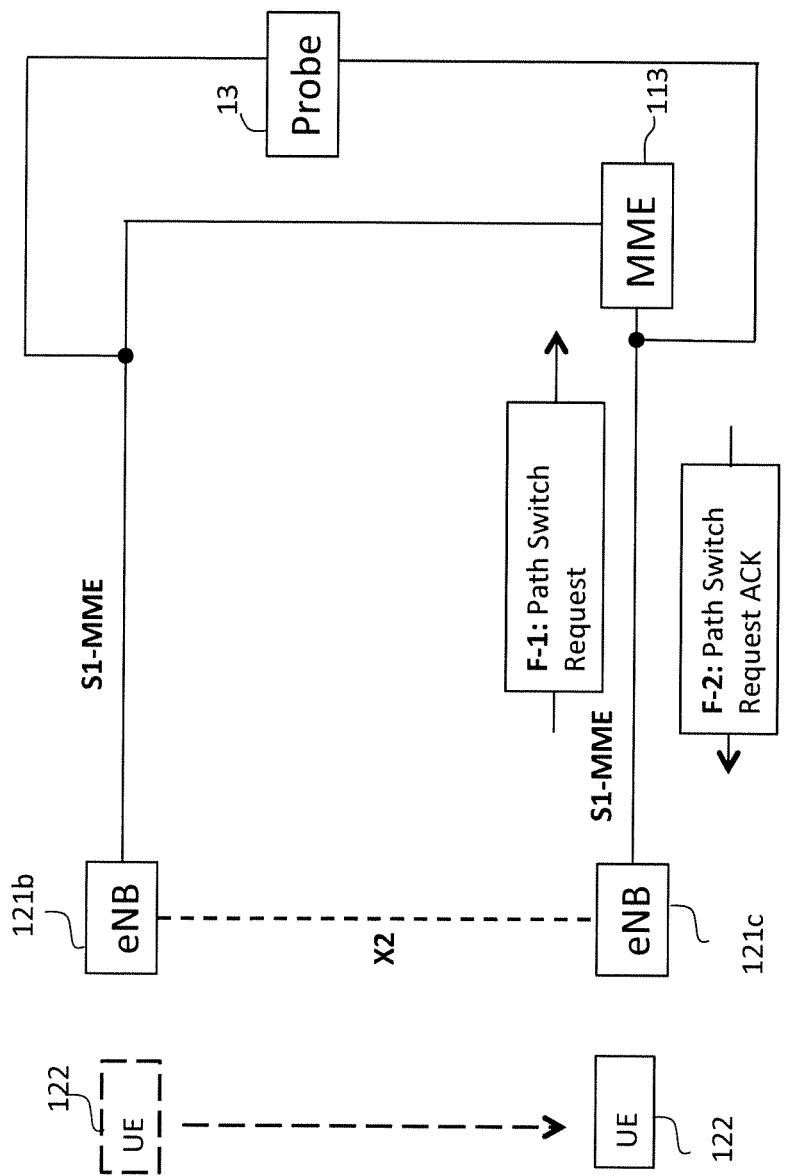
FIG. 11 illustrates the network monitoring probe connected to S1-MME interfaces of an MME with eNBs connected by logical X2 link in an LTE network according to a second embodiment of the invention.

In the invention, there is also provided a method for tracking user specific tunnels in the LTE network for the X2-based Handover scenario. FIG. 11 illustrates the network monitoring probe 13 connected to S1-MME interfaces of an MME with eNBs connected by logical X2 link in an LTE network. Referring to FIG. 10, the eNB 121b and eNB 121c are connected by a logical X2 link which operates on X2AP protocol as defined in 3GPP technical specifications. The eNB 121b and eNB 121c are respectively connected to the MME 113 via a first S1-MME interface and a second S1-MME interface. The monitoring probe 13 is connected to both S1-MME interfaces.

In the scenario of X2-based Handover, there is no change in MME but the current serving eNB is changed. For instance, when the UE 122 initially located in the radio service coverage area of the eNB 121b moves to that of the eNB 121c, the target eNB 121c transmits a Path Switch Request message over the S1-MME interface to the MME 113 at the step fF1. In response to the Path Switch Request message from the target eNB 121c, the MME 113 transmits a Path Switch Request ACK message to the target eNB 121c over the same S1-MME interface.

In general, the monitoring probe 13 may sniff hundreds of Path Switch Request messages or Path Switch Request ACK messages from S1-MME interfaces connected to the MME 113 within any second. Thus, it is difficult for the monitoring probe 13 to identify which Path Switch Request message is related to which Path Switch Request ACK message. In the invention, there is proposed a method for tracking user specific tunnels in X2-based Handover scenario.

Prior to X2 handover, the monitoring probe 13 has some of identity information in the configured memory allocation for the UE 122 shown in FIG. 8 such as the information stored in: the field D-1 (containing a control plane identifier eNB-UE-S1AP-ID corresponding to the currently serving eNB 121b); the field D-2 (containing a user device identifier IMSI of the UE 122); the field D-5 (containing a control plane identifier MME-UE-S1APID corresponding to the currently serving MME 113); the field D-8 (containing a control plane layer 3 address of the currently serving eNB 121b); the field D-11 (containing a control plane identifier CGI=eNB 121 for the eNB 121c).

In the step F-1, the control plane message monitor 313 monitors, via an input network interface 134, the eNB 121c on the S1-MME interface for receipt of a control plane message in the form of a Path Switch Request message to the current MME 113, the identifier comparator 318 may check a control plane identifier MME-UE-S1APID and another control plane identifier eNB-UE-S1APID included in the Path Switch Request message. For instance, the identifier comparator 318 may find that the control plane identifiers MME-UE-S1AP-ID1 and eNB-UE-S1AP-ID2 parameters in the Path Switch Request message, where the MME-UE-S1AP-ID1 corresponds to the MME 113, and the eNB-UE-S1AP-ID2 corresponds to the target eNB 121c. The MME-UE-S1APID1 is assigned by the MME 113 to the UE 122; the eNB-UE-S1APID2 is assigned by the target eNB 121c to the UE 122. Later, the identifier comparator 318 13 looks up the configured memory allocations for the UEs in the storage unit 132, and finds the control plane identifier MME-UE-S1AP-ID1 in the field D-5 of the configured memory allocation for the UE 122, since the MME-UE-S1AP-ID1 uniquely identifies the UE 122 within the MME 113. Up to this instance, the identifier comparator 318 can determine that the Path Switch Request message recently obtained by the control plane message monitor 313 is directly related to the UE 122 and may further look for the Path Switch Request ACK message from the MME 113. Also, the identifier output 319 may store the control plane identifier eNB-UE-S1AP-ID2 for the target eNB 122c in the field D-12 and the control plane IP address of the target eNB 122c in the field D-13. The identifier output 319 can reset the values stored in the fields D-14 to D-17 in this X2-based Handover scenario.

At the step F-1, when control plane message monitor 313 monitors, via an input network interface 134, the eNB 121c on the S1-MME interface for receipt of a control plane message in the form of a Path Switch Request ACK message to the MME 113. In this embodiment, the Path Switch Request ACK message contains the same a control plane identifier eNB-UE-S1APID2 parameter of the target eNB 122c and the corresponding control plane IP address of the target eNB 122c, the identifier output 319 of the monitoring probe 13 may determine to replace the field D-1 with the eNB-UE-S1APID2 parameter, and to replace the field D-8 with the value in the field D-13. Also, the identifier output 319 may determine to reset the fields D-10 to D-11 until the relevant identity values are assigned by the new serving eNB 121c at future instances.

Figure 12:
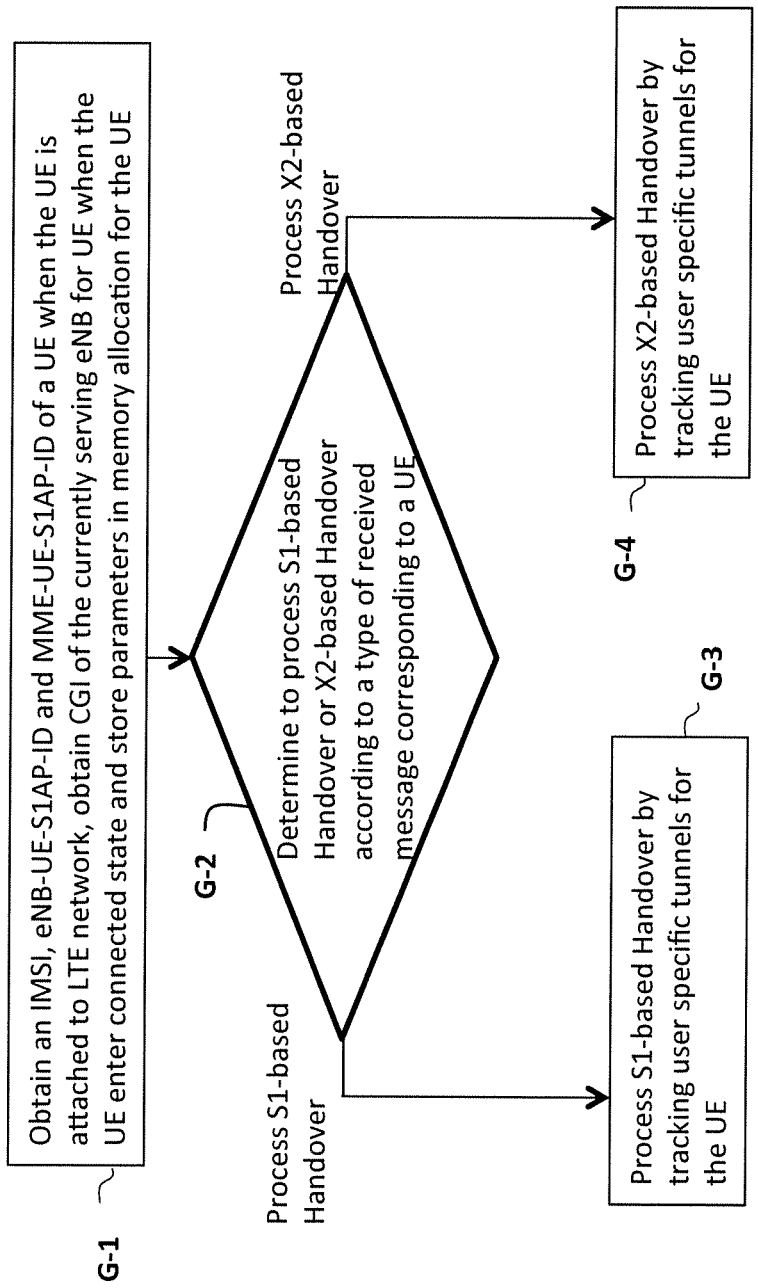
FIG. 12 is a flowchart of the method of tracking user specific tunnels traversed in the LTE network according to an embodiment of the present invention.

FIG. 12 is flowchart of the method of tracking user specific tunnels traversed in the LTE network according to an embodiment of the invention. Referring to FIG. 12, the method of tracking user specific tunnels may include following procedures.

At the step G-1, the monitoring probe 13 may obtain an IMSI, eNB-UE-S1AP-ID and MME-UE-S1AP-ID of a UE when the UE is attached to LTE network through the control plane message monitor 313, the identifier comparator 318 and the identifier output 319. Also at the same step G-1, the control plane message monitor 313 obtains CGI of the currently serving eNB for UE when the UE enters a connected state, and the identifier output 319 stores parameters in configured memory allocation for the UE. For instance, the Probe 13 may obtain the IMSI, eNB-UE-S1AP-ID and MME-UE-S1AP-ID of the UE 122 when the UE 122 is initially attached to the eNB 121b and under management of the MME 113 according to the methods illustrated in FIGS. 5 to 8. Then, the control plane message monitor 313 and the identifier comparator 318 obtain the CGI of the currently serving eNB 121b when the UE 122 enters the connected state. Furthermore, the identifier output 319 may respectively store the IMSI, eNB-UE-S1AP-ID and MME-UE-S1AP-ID of the UE 122 and the CGI in the fields D-2, D-1, D-5, D-11 of the configured memory allocation for the UE 122.

At the step G-2, the control plane message monitor 313 of the network monitoring probe 13 may determine to process S1-Handover or X2-Handover according to a type of message received/sniffed from the LTE network, where the received message is corresponding to a UE. For instance, if the control plane message monitor 313 receives a Handover Required message over an S1-MME interface, the control plane message monitor 313 may determine to process S1-Handover for the UE. For another instance, if the control plane message monitor 313 receives a Path Switch Request message over an S1-MME interface, the control plane message monitor 313 may determine to process S1-Handover for the UE.

At the step G-3, if the control plane message monitor 313 determines to process S1-Handover in the step G-2, then the monitoring probe 13 may process S1-Handover of the UE by tracking following user specific tunnels for the UE. For instance, the monitoring probe 13 may process S1-Handover by tracking following user specific tunnels for the UE 122 according to the methods illustrated in above-mentioned FIG. 10.

At the step G-4, if the control plane message monitor 313 determines to process X2-Handover in the step G-2, then the monitoring probe 13 may process X2-based Handover of the UE by tracking following user specific tunnels for the UE. For instance, the monitoring probe 13 may process X2-Handover by tracking following user specific tunnels for the UE 122 according to the methods illustrated in the above-mentioned FIG. 11.

Figure 13:
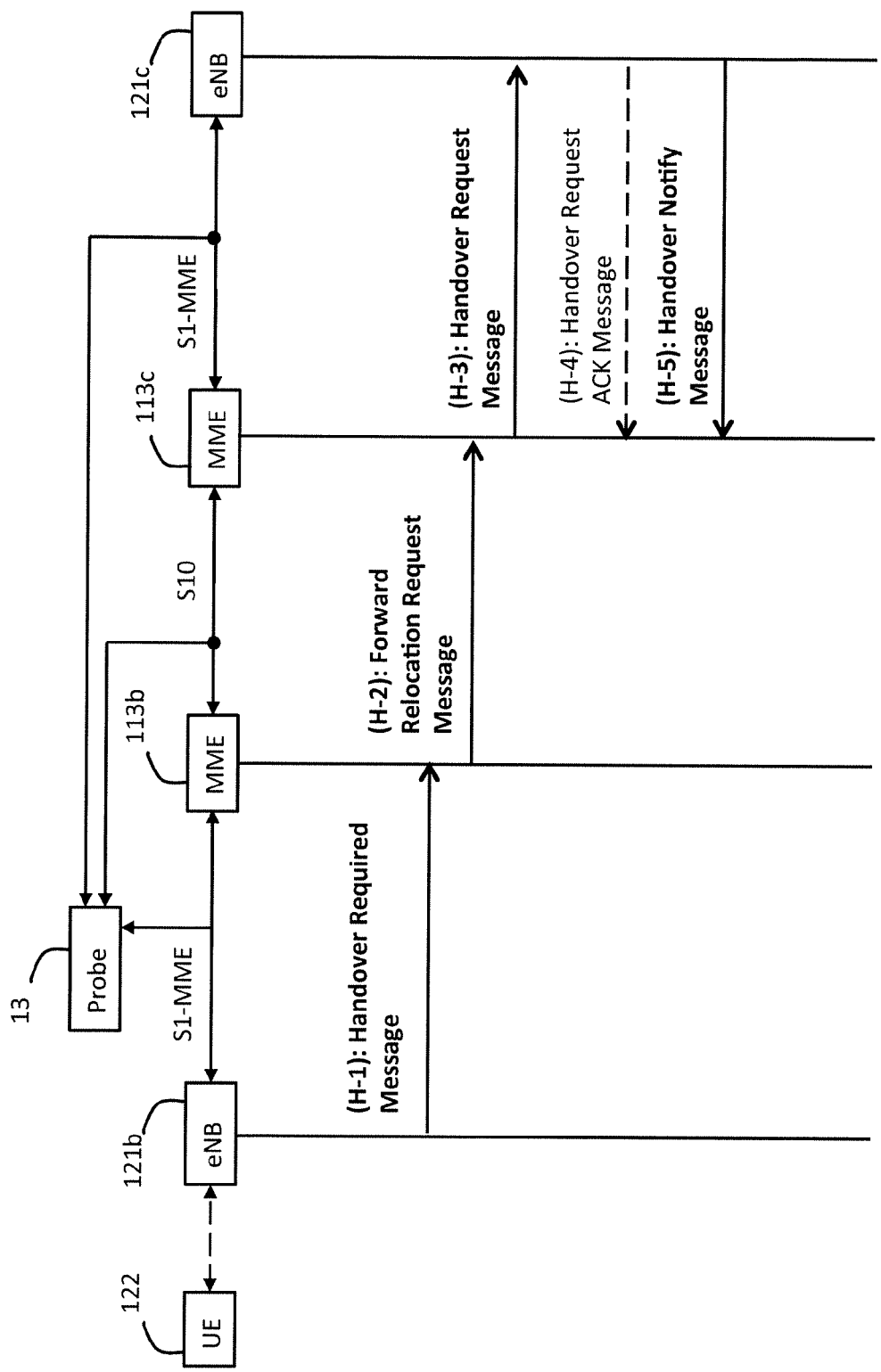
FIG. 13 is a flowchart of the method of tracking user specific tunnels traversed in the LTE network according to the first embodiment of the invention.

FIG. 13 is flowchart of a method of tracking user specific tunnels traversed in the network 10*b* according to the first embodiment of the invention. The method of tracking user specific tunnels in the LTE network is adapted for the network monitoring probe 13 to track user specific tunnels by tracking/identifying user device identifiers of the user device, tracking/identifying control plane identifiers corresponding to a user device, and/or updating identifiers of the user device when a user/UE performs S1-based Handover procedure, and may include following procedures. In following descriptions related to FIG. 13, the outputting of identifier(s) by the identifier output 319 of the network monitoring probe 13 may refer to outputting the identifier(s) to preconfigured memory allocation(s)/field(s) for the user device such that the identifiers may be stored in the preconfigured memory allocation(s) and the identifiers are associated for the same user device, and/or also may refer to output the identifier(s) to the CEM 150 such that the CEM 150 can update and track the identifier(s) of the user device. If the network monitoring probe 13 is configured with a correlation processor (not shown), the correlation processor can also update and track identifier(s) of the user device 122. Additionally, in following descriptions, the first control plane Protocol Data Unit (PDU), the second control plane PDU, the first control plane identifier, the second control plane identifier, the first user device identifier, the second user device identifier, and similar terms described in relation to FIG. 13 should be interpreted only referring to identifiers confined in the first embodiment defined by FIGS. 4, 9 and 13. These terms should not be confused with similar terms in descriptions related to FIG. 14.

At the step H-1, the control plane message monitor 313 of the network monitoring probe 13 may monitor, via an input network interface 134 of the network monitoring probe 13, a current serving base station eNB 121*b* (or a source base station before the S1-based handover procedure is completed), for receipt of a first control plane packet data unit (PDU) comprising at least a first control plane message comprising a first control plane identifier, and a first user device identifier. In the first embodiment, the network monitoring probe 13 is connected to at least the eNB 121*b* and the MME 113*b* via the S1-MME interface. Also, the first control plane PDU is a S1AP PDU transmitted from the eNB 121*b* to the MME 113*b*. The first control plane message is in the form of a handover required message transmitted in the first control plane PDU from the source base station eNB 121*b* of the user device 122 to a current serving MME 113*b* (or a source MME before the S1-based handover procedure is completed). Also, the control plane message monitor 313 may determine whether the first control plane message is a handover required message.

In the first embodiment, the first control plane identifier is in the form of a cell global identifier (CGI) of the source base station eNB 121*b* which serves the user device 122 before the S1-based handover procedure is completed. The first user device identifier in the first control plane message is in the form of a radio network temporary identifier (RNTI) of the user device.

At the step H-2, the control plane message monitor 313 may monitor, via an input network interface 134, the source MME 1131D for receipt of a second control plane message comprising at least a second control plane identifier, and a second user device identifier and a third user device identifier. In the first embodiment, the network monitoring probe 13 is also connected to the MME 113*b* and a MME 113*c* via a S10 interface between the MME 113*b* and the MME 113*c*. The second control plane message is in the form of a forward relocation request message. The second control plane identifier is in the form of a CGI of a base station (e.g., the eNB 121*b*). The second user device identifier is in the form of a RNTI of a user device. The third user device identifier is in the form of an IMSI of a user device. Also, the control plane message monitor 313 may determine whether the second control plane message is a forward relocation request message.

At the step H-2, in response to the receipt of the second control plane message by the control plane message monitor 313, the identifier comparator 318 may compare the first control plane identifier to the second control plane identifier and also compare the first user device identifier to the second user device identifier. Additionally, the control plane message monitor 313 is configured to determine whether the first control plane message is a handover required message. Specifically, the control plane message monitor 313 may check a specified field in the first control plane message which carries information for uniquely identifying the first control message to determine whether the first control message is a handover required message. For example, in S1AP protocol, each control plane message contains a Message Type information element (IE) which may be checked by the control plane message monitor 313 to determine the type of the message being sent. In response to a determination by the identifier comparator 318 that first control plane identifier is identical to the second control plane identifier and also the first user device identifier is identical to the second user device identifier, and a determination by the control plane message monitor 313 that the first control plane message is a handover required message, the identifier output 319 of the network monitoring probe 13 may output the first user device identifier of the first control plane message as an identified first user device identifier of the user device 122, and also output the third user device identifier of the second control plane message as an identified second user device identifier of the user device 122. Additionally, the first control plane message further comprises a third control plane identifier. In response to a determination that the first control plane identifier is identical to the second control plane identifier, the first user device identifier is identical to the second user device identifier and the first control plane message is a handover required message, the identifier output 319 may be configured to store or output the third control plane identifier of the target base station 121*c* which the user device 122 is to be handed over. The third control plane identifier is in the form of a CGI of a target cell base station (e.g., eNB 121*c*) to which the user device 122 is to be handed over.

At the step H-2, the control plane message monitor 313 may determine whether the second control plane message is a forward relocation request message. In response to a determination by the control plane message monitor 313 that the first control plane message is the handover required message and the second control plane message is the forward relocation request message, also in response to the determination by the identifier comparator 318 that first control plane identifier is identical to the third control plane identifier and also the first user device identifier is identical to the second user device identifier, the identifier comparator 318 may determine the user device 122 with the identified first and second user device identifiers currently commences a S1-based handover procedure. Additionally, in another embodiment, the procedures shown in FIG. 5 or FIG. 6 can be combined with procedures in FIG. 13 such that the identifier comparator 318 may compare eNB-UE-S1AP-ID obtained from Attach Request message to eNB-UE-S1AP-ID obtained from the handover required message. Upon a determination by the identifier comparator 318 that the eNB-UE-S1AP-ID obtained from attach request message is identical to eNB-UE-S1AP-ID obtained from the handover required message, the identifier comparator 318 may directly correlate the IMSI obtained from the attach request message to the CGI and RNTI obtained from the handover required message. Therefore, the step H-2 will be optional and the identifier output 319 can store or output the IMSI of the user device 122, CGI of the eNB 121b and RNTI assigned to the user device 122 by the eNB 121b in association. Also, the identifier output 319 can store or output the third control plane identifier of the target base station 121c which the user device 122 is to be handed over.

At the step H-3, the control plane message monitor 313 may monitor, via an input network interface 134, a target MME (e.g., the MME 113c) for receipt of a second control plane PDU comprising at least a fourth control plane identifier, a fifth control plane identifier, a third control plane message which comprises a sixth control plane identifier and a fourth user device identifier. In the first embodiment, the second control plane PDU is a S1AP PDU transmitted from the target MME to a target cell base station (e.g., the eNB 122c). The third control plane message is in the form of a handover request message transmitted in the second control plane PDU from the target MME 113c to the target cell base station eNB 121c. The fourth control plane identifier is in the form of a control plane evolved NodeB UE S1 Application Protocol Identifier (eNB-UE-S1AP-ID) assigned to a user device by a base station. The fifth control plane identifier is in the form of a control plane MME UE S1 Application Protocol Identifier (MME-UE-S1AP-ID) assigned to a user device by a MME. The sixth control plane identifier is in the form of a last visited cell CGI (i.e., a CGI of a base station which is a last cell visited by a user device). The fourth user device is in the form of a RNTI of a user device.

At the step H-3, in response to receipt of the third control plane message, the identifier comparator 318 may compare the sixth control plane identifier of the third control plane message to the first control plane identifier of the first control plane message, and also compare the fourth user device identifier to the first user device identifier of the first control plane message. In response to a determination by the identifier comparator 318 that the sixth control plane identifier of the third control plane message is identical to the first control plane identifier of the first control plane message, and also the fourth user device identifier is identical to the first user device identifier of the first control plane message, the identifier output 319 may output the fourth control plane identifier to be a control plane identifier assigned by a target base station to the user device and also output the fifth control plane identifier to be a control plane identifier assigned by the target MME 113c to the user device 122. In the example shown in FIG. 13, the fourth user device identifier is the RNTI of the user device 122 assigned by the source base station eNB 121b, and the sixth control plane identifier is a last visited CGI of a base station corresponding to the user device 122 (i.e., the source base station eNB 121b). Also, the control plane message monitor 313 may determine whether the third control plane message is a handover request message.

In the first embodiment, the first control plane PDU further comprises a seventh and an eighth control plane identifiers. The seventh control plane identifier is in the form of a control plane evolved NodeB UE S1 Application Protocol Identifier (eNB-UE-S1AP-ID) assigned by the source base station to the user device. The eighth control plane identifier of the first control plane PDU is in the form of a control plane MME UE S1 Application Protocol Identifier (MME-UE-S1AP-ID) assigned by a source MME to the user device. At the step H-1, in response to a determination by the identifier comparator 318 that the first control plane identifier is identical to the third control plane identifier and also the first user device identifier is identical to the second user device identifier, the identifier output 319 of the network monitoring probe 13 may output the seventh control plane identifier of the first control plane PDU to be a control plane evolved NodeB UE S1 Application Protocol Identifier (eNB-UE-S1AP-ID) assigned by the source base station to the user device, and also output the eighth control plane identifier of the first control plane PDU to be a control plane MME UE S1 Application Protocol Identifier (MME-UE-S1AP-ID) assigned by a source MME to the user device. The seventh control plane identifier is in the form of a control plane eNB-UE-S1AP-ID assigned by the source base station eNB 121b to the user device 122, the eighth control plane identifier is in the form of a control plane MME-UE-S1AP-ID assigned by the source MME 131b to the user device 122.

At the step H-4, the control plane message monitor 313 may monitor, via an input network interface 134, the target MME 113c for receipt of a third control plane PDU comprising at least an ninth and a tenth control plane identifier, and a fourth control plane message comprising at least a fifth user device identifier. In the first embodiment, the third control plane PDU is in the form of a S1AP PDU. The fourth control plane message is in the form of a handover request acknowledgement message transmitted from the target base station eNB 121c to the target MME 113c. Also, the ninth control plane identifier is in the form a control plane eNB-UE-S1AP-ID assigned to a user device by a base station, the tenth control plane identifier is in the form of a control plane MME-UE-S1AP-ID of a MME, and the fifth user device identifier is in the form of a RNTI of a user device. In the example shown in FIG. 13, the ninth control plane identifier is the eNB-UE-S1AP-ID assigned to the user device 122 by the target base station eNB 121c, the tenth control plane identifier is the MME-UE-S1AP-ID assigned to the user device 122 by the target base station MME 113c, and the fifth user device identifier is a new UE identity (corresponding to a RNTI) assigned by the target base station eNB 121c to the user device 122. Also, the control plane message monitor 313 may determine whether the fourth control plane message is a handover request acknowledgement message.

At the step H-4, in response to the receipt of the fourth control plane message by the control plane message monitor 313, the identifier comparator 318 may compare the ninth control plane identifier to the fourth control plane identifier of the second control plane PDU, and also compare the tenth user device identifier to the fifth control plane identifier of the second control plane PDU. In response to a determination by the identifier comparator 318 that the ninth control plane identifier is identical to the fourth control plane identifier of the second control plane PDU, and also the tenth user device identifier is identical to the fifth control plane identifier of the second control plane PDU, the identifier output 319 may output the ninth control plane identifier and the tenth control plane identifier as control plane identifiers of the user device respectively corresponding to the target base station and the target MME. In the example shown in FIG. 13, the identifier output 319 may output the ninth control plane identifier to be the eNB-UE-S1AP-ID of the user device 122 assigned by the target base station eNB 121c, and output the tenth control plane identifier to be the MME-UE-S1AP-ID of the user device 122 assigned by the target MME 113c. The step H-4 is optional if it is not necessary for the network monitoring probe 13 to obtain the latest RNTI of the user device 122.

At the H-5, the control plane message monitor 313 may monitor, via an input network interface 134, the target base station for receipt of a fourth control plane PDU comprising at least a fifth control plane message which comprises at least an eleventh and a twelfth control plane identifiers. In the first embodiment, the fifth control plane message is in the form of a handover notify message transmitted from the target base station eNB 121c to the target MME 113c. Also, the eleventh control plane identifier is in the form of a control plane eNB-UE-S1AP-ID assigned by the target base station to the user device and the twelfth control plane identifier is in the form of a control plane MME-UE-S1AP-ID assigned by the target MME to the user device.

At the step H-5, in response to the receipt of the fifth control plane message by the control plane message monitor 313, the identifier comparator 318 may compare the eleventh control plane identifier to the fourth control plane identifier of the second control plane PDU, and also compare the twelfth user device identifier to the fifth control plane identifier of the second control plane PDU. Also, the control plane message monitor 313 may determine whether the fifth control plane message is a handover notify message. In response to a determination by the identifier comparator 318 that the eleventh control plane identifier is identical to the fourth control plane identifier of the second control plane PDU, and also the twelfth user device identifier is identical to the fifth control plane identifier of the second control plane PDU and a determination by the control plane message monitor 313 that the fifth control plane message is the handover notify message, the identifier output 319 may output the fourth control plane identifier of the third control plane message to be a control plane eNB-UE-S1AP-ID assigned to the user device by a current serving base station of the user device, and outputting the fifth control plane identifier of the third control plane message to be a control plane MME-UE-S1AP-ID assigned to the user device by a current serving MME of the user device.

At the step H-5, in response to a determination by the identifier comparator 318 that the eleventh control plane identifier is identical to the fourth control plane identifier of the second control plane PDU, and also the twelfth user device identifier is identical to the fifth control plane identifier of the second control plane PDU and the determination by the control plane message monitor 313 that the fifth control plane message is the handover notify message, the identifier output 319 may output the fifth user identifier of the user device to be a RNTI assigned by the current serving base station (i.e., the eNB 122c) of the user device 122 which replaces the identified first user device identifier of the user device 122. Additionally, the network monitoring probe 13 may determine the S1-based handover procedure of the user device is complete.

Figure 14:
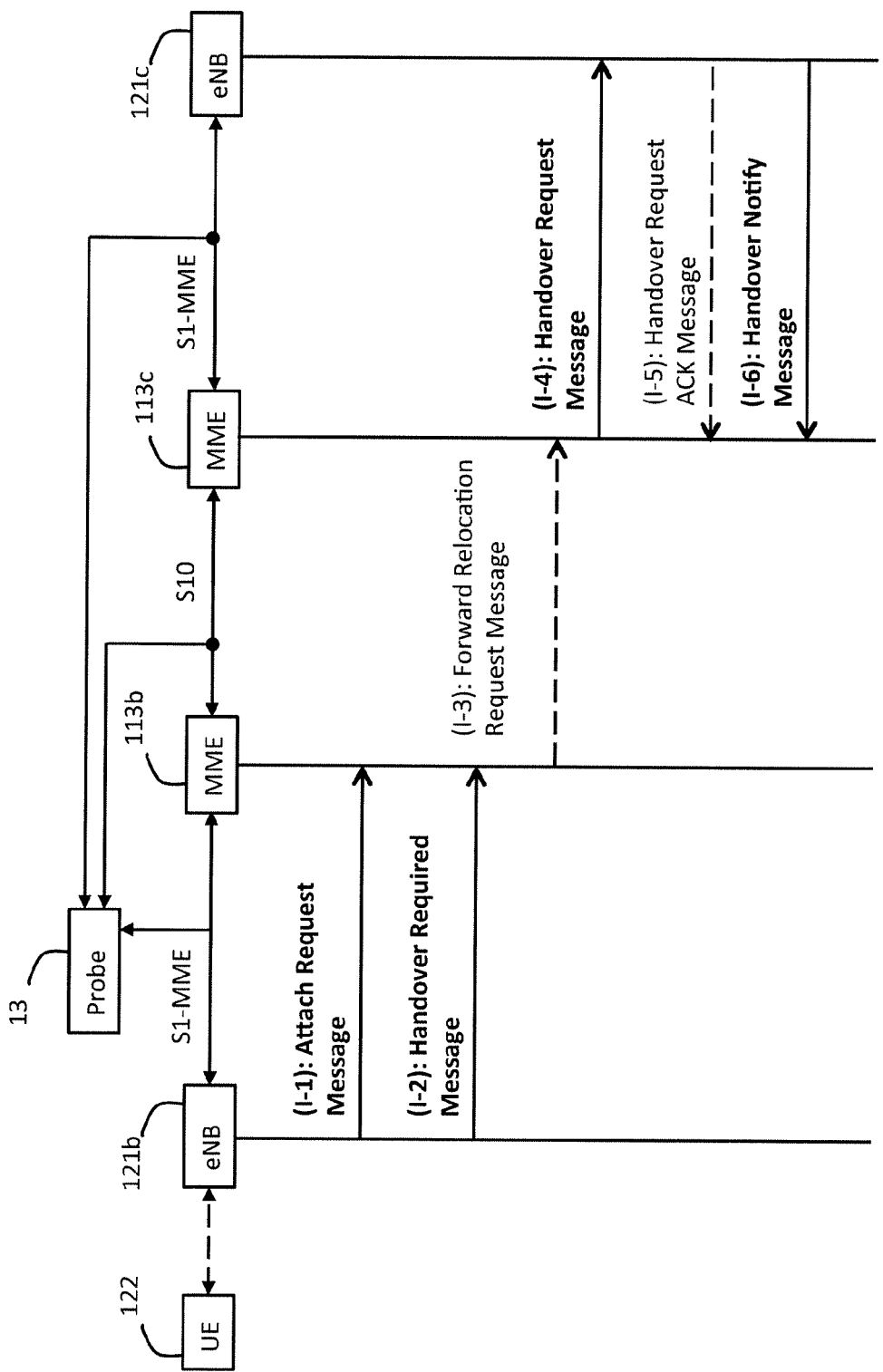
FIG. 14 is flowchart of a method of tracking user specific tunnels traversed in the network according to a third embodiment of the invention.

FIG. 14 is flowchart of a method of tracking user specific tunnels traversed in the network 10 according to a third embodiment of the invention. The third embodiment is an embodiment altered from the first embodiment, and the third embodiment can be implemented by the network monitoring probe 13, when it is required for the network monitoring probe 13 to extract IMSI or GUTI of a user device before the user device enters a RRC connected state, such that the user plane identifiers of the user device can also be acquired by the network monitoring probe 13 from related control plane interfaces and related networking devices in the LTE network.

Additionally, in following descriptions, the first control plane PDU, the second control plane PDU, the first control plane identifier, the second control plane identifier, the first user device identifier, the second user device identifier, and similar terms described in relation to FIG. 14 should be interpreted only referring to identifiers confined in the first embodiment defined by FIGS. 4, 9 and 14. These terms should not be confused with similar terms in descriptions related to FIG. 13.

At the step I-1, the control plane message monitor 313 of the network monitoring probe 13 may monitor, via an input network interface 134 of the network monitoring probe 13, a current serving base station eNB 121b, for receipt of a first control plane PDU comprising at least a first control plane identifier and a second control plane identifier and a first control plane message which comprises at least a user device identifier. In the third embodiment, the network monitoring probe 13 is connected to at least the eNB 121b and the MME 113b via the S1-MME interface. Also, the first control plane PDU is S1AP PDU. The first control plane message is in the form of a attach request message transmitted from the source base station eNB 121b of the user device 122 to a current serving MME 113b of the user device 122. The first control plane identifier is in the form of a control plane eNB-UE-S1AP-ID assigned by the source base station eNB 121b to the user device 122, the second control plane identifier is in the form of a control plane MME-UE-S1AP-ID assigned by the source MME 131b to the user device 122, and the a first user device identifier is in the form of a IMSI of the user device 122. Additionally, the control plane message monitor 313 may determine whether the first control plane message is a attach request message.

In the third embodiment, the first control PDU which transports the first control plane message from the source base station eNB 122b to the source MME 113b also comprises a third control plane identifier in the form of a CGI of a base station.

At the I-2, the control plane message monitor 313 may monitor, via an input network interface 134, the source base station eNB 121b for receipt of a second control plane PDU comprising at least a fourth control plane identifier and a fifth control plane identifier and a second control plane message which comprises at least a sixth control plane identifier, a seventh control plane identifier and a second user device identifier. In the third embodiment, the second control plane PDU is in the form of a S1AP PDU transmitted from the eNB 121c to the MME 113c, the fourth control plane identifier is in the form of a control plane eNB-UE-S1AP-ID assigned by a base station to the user device 122, the fifth plane identifier is in the form of a control plane MME-UE-S1AP-ID assigned by a MME to the user device 122. Also, the third control plane message is in the form of a handover required message transmitted from the eNB 121b to the MME 113c, the sixth control plane identifier is in the form of a CGI of a base station (e.g., the source base station eNB 121b), the seventh control plane identifier is in the form of a CGI of the other base station (e.g., the target base station eNB 121c), and the second user device is in the form of a RNTI assigned by a base station to the user device 122. Additionally, the control plane message monitor 313 may also determine whether the second control plane message is the handover required message.

At the step I-2, in response to receipt of the second control message by the control plane message monitor 313 the identifier comparator 318 of the network monitoring probe 13 may compare the third control plane identifier of the second control plane PDU to the first control plane identifier of the first control plane PDU, and also compare the fourth control plane identifier of the second control plane PDU to the second control plane identifier of the first control plane PDU. In response to a determination by the identifier comparator 318 that the third control plane identifier of the second control plane PDU is identical to the first control plane identifier of the first control plane PDU, and also the fourth control plane identifier of the second control plane PDU is identical to the second control plane identifier of the first control plane PDU, the identifier output 319 may output the first user device identifier of the first control plane message and the second user identifier of the second control plane message in association to be identified first and second identifier of the user device 122.

At the step I-2, in response to a determination by the control plane message monitor 313 that the second control plane message is the handover required message, the control plane message monitor 313 may determine that the user device 122 commences a S1-based handover procedure.

At the step I-2, in response to the control plane message monitor 313 that the second control plane message is the handover required message, the identifier comparator 318 may compare the third control plane identifier of the first control plane PDU to the sixth control plane identifier of the second control plane message. If the third control plane identifier of the first control plane PDU is identical to the sixth control plane identifier of the second control plane message, the identifier output 319 may output the third control plane identifier of the first control plane PDU to be a CGI of a source base station of the user device 122; otherwise, the identifier output 319 may output the sixth control plane identifier of the second control plane message to be a CGI of a source base station of the user device 122, in response to the determination by the identifier comparator 318 that the fourth control plane identifier of the second control plane PDU is identical to the first control plane identifier of the first control plane PDU, and also the fifth control plane identifier of the second control plane PDU is identical to the second control plane identifier of the first control plane PDU.

At the I-3, the control plane message monitor 313 may monitor, via an input network interface 134, the source MME 131b for receipt of a third control plane message comprising at least a third user device identifier, an eighth control plane identifier and a ninth control plane identifier. In the third embodiment, the network monitoring probe 13 is also connected to a MME 113c via a S10 interface between the MME 113b and the MME 113c. Also, the control plane message monitor 313 may determine whether the second control plane message is a handover required message. The third control plane message is in the form of a forward relocation request message transmitted from the target MME 113c to a target base station eNB 121c. The third user device identifier is in the form of a RNTI of a user device, the eighth control plane identifier is in the form of a CGI of a source base station of the user device 122 in the S1-based handover procedure, and the ninth control plane identifier is in the form of a CGI of a target base station of the user device 122 in the S1-based handover procedure.

In response to receipt of the third control plane message by the control plane message monitor 313, the identifier comparator 318 may compare the third user device identifier of the third control plane message to the second user device identifier of the second control plane message, and also compare the eighth control plane identifier of the third control plane message to the sixth control plane identifier of the second control plane message. In response to a determination that the third user device identifier of the third control plane message is identical to the second user device identifier of the second control plane message, and also the eighth control plane identifier of the third control plane message is identical to the sixth control plane identifier of the second control plane message, the identifier comparator 318 may determine the third control plane message is corresponding to the S1-based handover procedure performed by the user device 122. The step I-3 is optional and may be skipped if the network monitoring probe 13 can directly determine a corresponding handover request message followed by the second control plane message (i.e., the handover required message).

At the I-4, the control plane message monitor 313 may monitor, via an input network interface 134, the target MME 113c for receipt of a fourth control plane PDU comprising a tenth control plane identifier and an eleventh control plane identifier and a fourth control plane message which comprises at least a fourth user device identifier, a twelfth control plane identifier. In the first embodiment, the fourth control plane PDU is S1AP PDU, the fourth control plane message is in the form of a handover request message transmitted from the target MME 113c to the target base station eNB 121c. Also, the twelfth control plane identifier is in the form of a last visited CGI (e.g., the source base station eNB 121b in the example of FIG. 14) of the user device 122 before the S1-based handover procedure is completed. Furthermore, the tenth control plane identifier is in the form of a eNB-UE-S1AP-ID of a user device assigned by a base station and the eleventh control plane identifier is in the form of a MME-UE-S1AP-ID of a user device assigned by a MME, and the fourth user device identifier is in the form of a RNTI of a user device. In the example shown in FIG. 14, the tenth control plane identifier is the eNB-UE-S1AP-ID of a user device assigned by the target base station eNB 121c, the eleventh control plane identifier is the MME-UE-S1AP-ID of a user device assigned by the target base station MME 113c, and the fourth user device identifier is the RNTI of the user device 122 assigned previously by the source base station eNB 121b.

At the step I-4, in response to the receipt of the fourth control plane message by the control plane message monitor 313, the identifier comparator 318 may compare the fourth user device identifier of the fourth control plane identifier to the second user device identifier of the second first control plane message, and also compare the twelfth control plane identifier of the fourth control plane message to the sixth control plane identifier of the second control plane message. In response to a determination by the identifier comparator 318 that the fourth user device identifier of the fourth control plane identifier is identical to the second user device identifier of the second first control plane message, and also the twelfth control plane identifier of the fourth control plane message is identical to the sixth control plane identifier of the second control plane message, the identifier output 319 may output the tenth control plane identifier to be a control plane eNB-UE-S1AP-ID assigned by the target base station eNB 121c to the user device 122, and also output the eleventh control plane identifier to be the control plane MME-UE-S1AP-ID assigned by the target base station MME 113c to the user device 122. In the example shown in FIG. 13, the identifier output 319 may output the tenth control plane identifier to be the eNB-UE-S1AP-ID of the user device 122 assigned by the target base station eNB 121c, and output the eleventh control plane identifier to be the MME-UE-S1AP-ID of the user device 122 assigned by the target MME 113c.

At the I-5 , the control plane message monitor 313 may monitor, via an input network interface 134, the target base station for receipt of a fourth control plane PDU comprising at least a thirteenth control plane identifier and a fourteenth control plan identifier, and a fifth control plane message which comprises at least a fifth user device identifier. In the first embodiment, the fifth control plane PDU is in the form of S1AP PDU. The fifth control plane message is in the form of a handover request acknowledgement message transmitted from the target base station eNB 121c to the target MME 113c. Also, the thirteenth control plane identifier is in the form a a control plane eNB-UE-S1AP-ID assigned to a user device by a base station, the fourteenth control plane identifier is in the form of a control plane MME-UE-S1AP-ID of a MME, and the fifth user device identifier is in the form of a new UE identity (corresponding to a RNTI) of a user device. In the example shown in FIG. 14, the thirteenth control plane identifier is the eNB-UE-S1AP-ID assigned to the user device 122 by the target base station eNB 121c, the fourteenth control plane identifier is the MME-UE-S1AP-ID assigned to the user device 122 by the target base station MME 113c, and the fifth user device identifier is a new UE identity (corresponding to a RNTI) assigned by the target base station eNB 121c to the user device 122. Also, the control plane message monitor 313 may determine whether the fourth control plane message is a handover request acknowledgement message.

At the step I-5, in response to the receipt of the fifth control plane message by the control plane message monitor 313, the identifier comparator 318 may compare the thirteenth control plane identifier to the tenth control plane identifier of the third control plane PDU, and also compare the fourteenth user device identifier to the eleventh control plane identifier of the third control plane PDU. In response to a determination by the identifier comparator 318 that the thirteenth control plane identifier is identical to the tenth control plane identifier of the third control plane PDU, and also the fourteenth user device identifier is identical to the eleventh control plane identifier of the third control plane PDU, the identifier output 319 may output the fifth user device identifier to be identified third user device identifier of the user device 122, where the identified third user device identifier is assigned by the target base station. The step H-4 is optional if it is not necessary for the network monitoring probe 13 to obtain the latest RNTI of the user device 122.

At the I-6, the control plane message monitor 313 may monitor, via an input network interface 134, the target base station for receipt of a fifth control plane PDU comprising at least a sixth control plane message which comprises at least an fifteenth and a sixteenth control plane identifiers. In the third embodiment, the fifth control plane PDU is S1AP PDU, the fifth control plane message is in the form of a handover notify message transmitted from the target base station eNB 121c to the target MME 113c. Also, the fifteenth control plane identifier is in the form of a control plane eNB-UE-S1AP-ID assigned by the target base station to the user device and the sixteenth control plane identifier is in the form of a control plane MME-UE-S1AP-ID assigned by the target MME to the user device.

At the step I-6, in response to the receipt of the sixth control plane message by the control plane message monitor 313, the identifier comparator 318 may compare the fifteenth control plane identifier to tenth control plane identifier of the third control plane PDU, and also compare the sixteenth control plane identifier to the eleventh control plane identifier of the third control plane PDU. Also, the control plane message monitor 313 may determine whether the sixth control plane message is a handover notify message. In response to a determination by the identifier comparator 318 that the fifteenth control plane identifier is identical to tenth control plane identifier of the third control plane PDU, and also the sixteenth control plane identifier is identical to the eleventh control plane identifier of the third control plane PDU and a determination by the control plane message monitor 313 that the sixth control plane message is the handover notify message, the identifier output 319 may output thirteenth control plane identifier to be the eNB-UE-S1AP-ID of the user device 122 assigned by the target base station eNB 121c, and output the fourteenth control plane identifier to be the MME-UE-S1AP-ID of the user device 122 assigned by the target MME 113c, as in the example shown in FIG. 14.

At the step I-6, in response to a determination by the identifier comparator 318 that fifteenth control plane identifier is identical to tenth control plane identifier of the third control plane PDU, and also the sixteenth control plane identifier is identical to the eleventh control plane identifier of the third control plane PDU and a determination by the control plane message monitor 313 that the sixth control plane message is the handover notify message, the identifier output 319 may also output the fifth user identifier of the user device to be a RNTI assigned by the current serving base station (i.e., the eNB 122c) of the user device 122 which replaces the identified first user device identifier of the user device 122. Additionally, the network monitoring probe 13 may determine the S1-based handover procedure of the user device is complete.

The third embodiment implemented by the network monitoring probe 13 enables to obtain the mapping relationship of the IMSI of the user device 122, the control plane eNB-UE-S1AP-ID and the control plane MME-UE-S1AP-ID of the user device 122 on the S1-MME interface, therefore the third embodiment can be used in junction with other method(s)/technique(s) implemented in the network monitoring probe 13 to obtain user plane identifiers of the user device 122. Also, when the step I-3 is skipped in the third embodiment, in fact the network monitoring probe 13 is required to be connected to only S1-MME interfaces between base station(s) and corresponding MME(s), and thereby reduce capital expenditure and operational expenditure compared to S1-MME interface(s) and S10 interface(s) connected to the network monitoring probe 13 in the first embodiment.

By executing the method for tracking user specific tunnels without querying any MMEs in the LTE network, the network monitoring probe 13 is still able to distinguish the control plane messages in the user specific tunnels, and thus obtain required identity parameters from sniffing user specific tunnels traversed over the S1-MME interface after S1-Handover or X2-Handover.

The preceding embodiments of the present invention may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the present disclosure, a "computer-readable medium" may be any storage media or means that can carry, store, communicate, propagate or transport the instructions for use by or in connection with an instruction execution system, apparatus, or device, such as a computing device, a network monitoring probe 13 shown in FIGS. 3, 4 and 9. A computer-readable medium may include a computer-readable storage medium (e.g., a physical device) that may be any media or means that can carry or store the instructions for use by or in connection with a system, apparatus, or device, such as a computer or a communication device. For instance, the storage unit 132 may include the computer-readable medium which may include computer program code, when executed by the processor unit 131, may cause the network monitoring probe 13 to perform procedures/steps illustrated in FIGS. 5 to 14.

Embodiments of the method of the present invention provide useful solutions to enable network monitoring probes to identify and track user specific tunnels in LTE networks.

The above embodiments have been described by way of example only and modifications are possible within the scope of the claims that follow.

The invention claimed is:

1. A method for tracking identifiers corresponding to a user device by a network monitoring probe connected with a source base station, a target base station, a source mobility management entity device (MME) and a target MME in a wireless communication network, comprising:
monitoring the source base station by the network monitoring probe, for receipt of a first control plane packet data unit (PDU) comprising at least a first control plane message transmitted from the source base station to the source MME, the first control plane message including at least a first control plane identifier of the source base station, and a first user device identifier of the user device;
monitoring the source MME by the network monitoring probe, for receipt of a second control plane message transmitted from the source MME to the target MME, which comprises at least a second control plane identifier of the source base station, a second user device identifier and a third user device identifier wherein the second and the third user device identifiers uniquely identify the user device in the wireless communication network;
in response to receipt of the second control plane message, comparing the first control plane identifier of the source base station to the second control plane identifier of the source base station, comparing the first user device identifier to the second user device identifier, and determining whether the first control plane message is a handover required message; and
in response to a determination that the first control plane identifier is identical to the second control plane identifier, the first user device identifier is identical to the second user device identifier and the first control plane message is a handover required message, storing in the network monitoring probe or an external management device the first user device identifier and the third user device identifier respectively as an identified first user device identifier and an identified second user device identifier of the user device, and determining that the user device commences a S1-based handover;
wherein:
the first control plane identifier is a cell global identifier (CGI) of the source base station;
the second control plane identifier is a CGI of the source base station;
the first user device identifier is a radio network temporary identifier (RNTI) of the user device;
the second user device identifier is a RNTI of a user device;
the third user device identifier is an International Mobile Subscriber Identity (IMSI) of a user device;
the first control plane PDU is a S1 Application Protocol PDU;
the first control plane message is a handover required message transmitted from the source base station to the source MME; and
the second control plane message is a forward relocation request message transmitted from the source MME to the target MME.

2. The method of claim 1, wherein the first control plane message further comprises a third control plane identifier of the target base station, the method further comprising:
in response to a determination that the first control plane identifier is identical to the third control plane identifier, the first user device identifier is identical to the second user device identifier and the first control plane message is a handover required message, storing in the network monitoring probe or an external management device the third control plane identifier of the target base station which the user device is to be handed over.

3. The method of claim 2, further comprising:
monitoring the target MME connected with the source MME, by the network monitoring probe, for receipt of a second control plane PDU comprising at least a fourth control plane identifier, a fifth control plane identifier, and at least a third control plane message transmitted from the target MME to the target base station, which comprises at least a sixth control plane identifier and a fourth user device identifier;
in response to receipt of the third control plane message in the second control plane PDU, comparing the sixth control plane identifier to the first control plane identifier of the first control plane message and comparing the fourth user device identifier to the first user device identifier of the first control plane message; and
in response to a determination that the sixth control plane identifier is identical to the second control plane identifier of the first control plane message and the fourth user device identifier is identical to the first user device identifier of the first control plane message, storing in the network monitoring probe or an external management device the fourth control plane identifier to be a control plane identifier assigned by the target base station to the user device, the fifth control plane identifier to be a control plane identifier assigned by the target MME to the user device.

4. The method of claim 3, wherein:
the third control plane message is a handover request message transmitted from the target MME to the target base station;
the sixth control plane identifier of the third control plane message is a last visited CGI of a base station corresponding to the user device; and the fourth user device identifier of the third control plane message is the RNTI assigned to the user device by the source base station.

5. The method of claim 4, wherein:
the second control plane PDU is S1AP PDU;
the fourth control plane identifier is a control plane evolved NodeB UE S1 Application Protocol Identifier (eNB-UE-S1AP-ID) assigned by the target base station to the user device; and
the fifth control plane identifier is a control plane MME UE S1 Application Protocol Identifier (MME-UE-S1AP-ID) assigned by the target MME to the user device.

6. The method of claim 5, wherein the first control plane PDU further comprises a seventh and an eighth control plane identifiers, the method further comprising:
in response to a determination that first control plane identifier is identical to the second control plane identifier and the first user device identifier is identical to the second user device identifier, storing in the network monitoring probe or an external management device the seventh control plane identifier of the first control plane PDU to be a control plane eNB-UE-S1AP-ID assigned by the source base station to the user device, and storing or outputting the eighth control plane identifier of the first control plane PDU to be a MME-UE-S1AP-ID assigned by the source MME to the user device.

7. The method of claim 6, further comprising:
monitoring the target base station by the network monitoring probe, for receipt of a third control plane PDU comprising at least a ninth and a tenth control plane identifier, and a fourth control plane message transmitted from the target base station to the target MME, which comprises at least a fifth user device identifier;
comparing the ninth control plane identifier to the fourth control plane identifier of the second control plane PDU, and comparing the tenth control plane identifier to the fifth control plane identifier of the second control plane PDU; and
in response to a determination that the ninth control plane identifier is identical to the fourth control plane identifier of the second control plane PDU, and the tenth user device identifier is identical to the fifth control plane identifier of the second control plane PDU, storing in the network monitoring probe or an external management device the fifth user device identifier to be an identified third user device identifier of the user device.

8. The method of claim 7, wherein:
the third control plane PDU is S1AP PDU;
the fourth control plane message is a handover request acknowledgement message transmitted from the target base station to the target MME;
the fifth user identifier is a new user device identifier assigned by the target base station;
the ninth user device identifier is a control plane eNB-UE-S1AP-ID assigned by the target base station to the user device; and
the tenth control plane identifier is a MME-UE-S1AP-ID assigned by the target MME to the user device.

9. The method of claim 8, further comprising:
monitoring the target base station by the network monitoring probe, for receipt of a fourth control plane PDU comprising at least an eleventh and a twelfth control plane identifiers and a fifth control plane message transmitted from the target base station to the target MME;
determining whether the fifth control plane message is a handover notify message;
comparing the eleventh control plane identifier to the fourth control plane identifier of the second control plane PDU, and comparing the twelfth control plane identifier to the fifth control plane identifier of the second control plane PDU; and
in response to a determination that the fifth control plane message is the handover notify message, the eleventh control plane identifier is identical to the fourth control plane identifier of the second control plane PDU, and the twelfth control plane identifier is identical to the fifth control plane identifier of the second control plane PDU, storing or outputting the fourth control plane identifier of the second control plane PDU to be a control plane eNB-UE-S1AP-ID assigned to the user device by a current serving base station of the user device, and storing in the network monitoring probe or an external management device the fifth control plane identifier of the second control plane PDU to be a control plane MME-UE-S1AP-ID assigned to the user device by a current serving MME of the user device.

10. The method of claim 9, further comprising:
in response to a determination that the fifth control plane message is the handover notify message, the eleventh control plane identifier is identical to the fourth control plane identifier of the second control plane PDU, and the twelfth user device identifier is identical to the fifth control plane identifier of the second control plane PDU, storing or outputting the fifth user identifier of the user device to be a RNTI assigned by the current serving base station of the user device which replaces the identified first user device identifier of the user device.

11. A network monitoring probe for tracking identifiers corresponding to a user device, wherein the network monitoring probe connected with a source base station, a target base station, a source mobility management entity device (MME) and a target MME in wireless communication network, the network monitoring probe comprising:
a control plane message monitor, configured to monitor the source base station for receipt of a first control plane packet data unit (PDU) comprising at least a first control plane message transmitted from the source base station to the source MME, which comprises at least a first control plane identifier of the source base station, and a first user device identifier of the user device;
the control plane message monitor, further configured to monitor the source MME for receipt of a second control plane message transmitted from the source MME to the target MME, the second control plane message including at least a second control plane identifier of the source base station, a second user device identifier and a third user device identifier wherein the second and the third user device identifiers uniquely identify the user device in the wireless communication network;
the control plane message monitor, further configured to determine whether the first control plane message is a handover required message;
an identifier comparator, configured to compare the first control plane identifier of the source base station to the second control plane identifier of the source base station and compare the first user device identifier to the second user device identifier;

an identifier output, configured to output to a storage unit within the network monitoring probe or a management device external to the network monitoring probe, the first user device identifier of the first control plane message and the third user device identifier of the second control plane message as identified first user device identifier and identified second user device identifier of the user device, in response to a determination that the first control plane identifier is identical to the second control plane identifier and the first user device identifier is identical to the second user device identifier; and the identifier comparator, further configured to determine that the user device with the identified first and the second user device identifiers commences a S1-based handover, in response to the determination that first control plane identifier is identical to the third control plane identifier, the first user device identifier is identical to the second user device identifier, and the first control plane message is the handover required message;

the first control plane identifier is a cell global identifier (CGI) of the source base station;

the second control plane identifier is a CGI of a base station;

the first control plane message further comprises a third control plane identifier which is a CGI of the target base station to which the user device is to be handed over;

the first user device identifier is a radio network temporary identifier (RNTI) of the user device;

the second user device identifier is a RNTI of a user device;

the first control plane PDU is a S1 Application Protocol PDU;

the first control plane message is a handover request message transmitted from the source base station to the source MME;

the second control plane message is a forward relocation request message transmitted from the source the source MME to the target MME; and the third user device identifier is an International Mobile Subscriber Identity (IMSI) of a user device.

12. The network monitoring probe of claim 11, wherein:
the control plane message monitor, further configured to monitor the target MME connected with the source MME for receipt of a second control plane PDU comprising at least a fourth control plane identifier, a fifth control plane identifier, and at least a third control plane message transmitted from the target MME to the target base station, which comprises at least a sixth control plane identifier and a fourth user device identifier;

the identifier comparator, further configured to compare the sixth control plane identifier to the first control plane identifier of the first control plane message and comparing the fourth user device identifier to the first user device identifier of the first control plane message, in response to receipt of the third control plane message in the second control plane PDU; and the identifier output, further configured to output to a storage unit of the network monitoring probe or a management device external to the network monitoring probe, the fourth control plane identifier to be a control plane identifier assigned by the target base station to the user device and output the fifth control plane identifier to be a control plane identifier assigned by the target MME to the user device, in response to a determination that the sixth control plane identifier is identical to the second control plane identifier of the first control plane message and the fourth user device identifier is identical to the first user device identifier of the first control plane message.

13. The network monitoring probe of claim 12, wherein:
the third control plane message is a handover request message transmitted from the target MME to the target base station;

the sixth control plane identifier of the third control plane message is a last visited CGI of a base station corresponding to the user device;

the fourth user device identifier of the third control plane message is the RNTI assigned to the user device by the source base station;

the second control plane PDU is S1AP PDU;

the fourth control plane identifier is a eNB-UE-S1AP-ID assigned by the target base station to the user device; and the fifth control plane identifier is a MME-UE-S1AP-ID assigned by the target MME to the user device.

14. The network monitoring probe of claim 13, wherein:
the first control plane PDU further comprises a seventh and an eighth control plane identifiers; and the identifier output, further configured to output to a storage unit of the network monitoring probe or a management device external to the network monitoring probe, the seventh control plane identifier of the first control plane PDU to be a control plane eNB-UE-S1AP-ID assigned by the source base station to the user device, and output the eighth control plane identifier of the first control plane PDU to be a control plane MME-UE-S1AP-ID assigned by the source MME to the user device, in response to a determination that first control plane identifier is identical to the third control plane identifier and the first user device identifier is identical to the second user device identifier.

15. The network monitoring probe of claim 14, wherein:
the control plane message monitor, further configured to monitor the target base station for receipt of a third control plane PDU comprising at least a ninth and a tenth control plane identifier, and a fourth control plane message transmitted from the target base station to the target MME, which comprises at least a fifth user device identifier;

the identifier comparator, further configured to compare the ninth control plane identifier to the fourth control plane identifier of the second control plane PDU, and comparing the tenth control plane identifier to the fifth control plane identifier of the second control plane PDU, in response to receipt of the fourth control plane message; and the identifier output further configured to output to a storage unit of the network monitoring probe or a management device external to the network monitoring probe, the fifth user device identifier to be an identified third user device identifier of the user device, in response to a determination that the ninth control plane identifier is identical to the fourth control plane identifier of the second control plane PDU, and the tenth user device identifier is identical to the fifth control plane identifier of the second control plane PDU.

16. The network monitoring probe of claim 15, wherein:
the third control plane PDU is S1AP PDU;

the fourth control plane message is a handover request acknowledgement message transmitted from the target base station to the target MME;

the fifth user identifier is a new user device identifier assigned by the target base station;

the ninth user device identifier is a control plane eNB-UE-S1AP-ID assigned by the target base station to the user device; and the tenth control plane identifier is a MME-UE-S1AP-ID assigned by the target MME to the user device.

17. The network monitoring probe of claim 16, wherein:

the control plane message monitor, further configured to monitor the target base station for receipt of a fourth control plane PDU comprising at least an eleventh and a twelfth control plane identifiers and a fifth control plane message transmitted from the target base station to the target MME;

the control plane message monitor, further configured to determine whether the fifth control plane message is a handover notify message;

the identifier comparator, further configured to compare the eleventh control plane identifier to the fourth control plane identifier of the second control plane PDU, and comparing the twelfth control plane identifier to the fifth control plane identifier of the second control plane PDU, in response to receipt of the fifth control plane message; and the identifier output, further configured to output to a storage unit of the network monitoring probe or a management device external to the network monitoring probe, the fourth control plane identifier of the second control plane PDU to be a control plane eNB-UE-S1AP-ID assigned to the user device by a current serving base station of the user device, and outputting the fifth control plane identifier of the second control plane PDU to be a control plane MME-UE-S1AP-ID assigned to the user device by a current serving MME of the user device, in response to a determination that the fifth control plane message is the handover notify message, the eleventh control plane identifier is identical to the fourth control plane identifier of the second control plane PDU, and the twelfth control plane identifier is identical to the fifth control plane identifier of the second control plane PDU.

18. The network monitoring probe of claim 17, wherein:

the identifier output, further configured to output to a storage unit of the network monitoring probe or a management device external to the network monitoring probe, the fifth user identifier of the user device to be a RNTI assigned by the current serving base station of the user device which replaces the identified first user device identifier of the user device, in response to a determination that the fifth control plane message is the handover notify message, the eleventh control plane identifier is identical to the fourth control plane identifier of the third control plane message, and the twelfth control plane identifier is identical to the fifth control plane identifier of the third control plane message.

* * * * *